(12) United States Patent
Kanamori et al.

(10) Patent No.: US 7,760,256 B2
(45) Date of Patent: *Jul. 20, 2010

(54) IMAGE PROCESSING APPARATUS THAT OBTAINS COLOR AND POLARIZATION INFORMATION

(75) Inventors: Katsuhiro Kanamori, Nara (JP); Satoshi Sato, Osaka (JP); Hiroaki Okayama, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/307,609

(22) PCT Filed: May 1, 2008

(86) PCT No.: PCT/JP2008/001136

§ 371 (c)(1), (2), (4) Date: Jan. 6, 2009

(87) PCT Pub. No.: WO2008/149489

PCT Pub. Date: Dec. 11, 2008

(65) Prior Publication Data

US 2009/0290039 A1  Nov. 26, 2009

(30) Foreign Application Priority Data

May 31, 2007 (JP) .............................. 2007-145897

(51) Int. Cl.
*H04N 3/14* (2006.01)
*H04N 5/335* (2006.01)

(52) U.S. Cl. ..................... 348/280; 348/222.1; 348/273

(58) Field of Classification Search .................. 348/280
See application file for complete search history.

(56) References Cited

U.S. PATENT DOCUMENTS 5,028,138 A  7/1991  Wolff (Continued)

FOREIGN PATENT DOCUMENTS

JP  11-212433  8/1989

(Continued)

OTHER PUBLICATIONS

International Search Report for corresponding Application No. PCT/JP2008/001136 mailed Aug. 5, 2008.

(Continued)

*Primary Examiner*—Ngoc-Yen T Vu
(74) *Attorney, Agent, or Firm*—Renner, Otto, Boisselle & Sklar, LLP

(57) ABSTRACT

An image processing apparatus according to the present invention includes: a color and polarization obtaining section 101 including a single-chip color image capture element with a color mosaic filter and a patterned polarizer in which a number of polarizer units, of which the polarization transmission planes define mutually different angles, are arranged adjacent to each other within each single color pixel; a color information processing section 102 for getting average color intensity information by averaging the intensities of the light rays that have been transmitted through the polarizer units within each said single color pixel; and a polarization information processing section 103 for approximating, as a sinusoidal function, a relation between the intensity of light rays that have been transmitted through the polarizer units within each said single color pixel and the angles of the polarization transmission planes of the polarizer units.

11 Claims, 27 Drawing Sheets

U.S. PATENT DOCUMENTS

| | | | |
|---|---|---|---|
| 5,557,324 A | 9/1996 | Wolff | |
| 6,724,531 B2* | 4/2004 | Oono | 359/497 |
| 7,582,857 B2* | 9/2009 | Gruev et al. | 250/225 |
| 7,626,585 B2* | 12/2009 | Kondo et al. | 345/426 |
| 2005/0133879 A1* | 6/2005 | Yamaguti et al. | 257/435 |
| 2008/0303891 A1* | 12/2008 | Dana et al. | 348/25 |
| 2009/0278954 A1* | 11/2009 | Kanamori et al. | 348/222.1 |
| 2009/0279807 A1* | 11/2009 | Kanamorl et al. | 382/274 |

FOREIGN PATENT DOCUMENTS

| | | |
|---|---|---|
| JP | 2005-019958 | 1/2005 |
| JP | 2005-287073 | 10/2005 |
| JP | 2005-333336 | 12/2005 |
| JP | 2006-254331 | 9/2006 |
| JP | 2007-086720 | 4/2007 |

OTHER PUBLICATIONS

Lawrence B. Wolff, "Polarization Vision: A New Sensory Approach to Image Understanding", Image and Vision Computing 15 (1997), pp. 81-93, Elsevier Science B.V. (cited in [0004], p. 3 of the description), [1997].

T. Kawashima et al., "Development of Polarization Imaging Device and Applications by Using Patterned Polarizer", Institute of Electronics, Information and Communication Engineers of Japan, National Conference 2006, No. D-11-52, p. 52, Mar. 2006, (cited in [0005], p. 4 of the description).

Hisao Kikuta et al., "Polarized Image Measuring System", Oplus E, vol. 25, No. 11, pp. 1241-1247, 2003 and a partial translation thereof (cited in [0005], p. 4 of the description).

James D. Barter et al., "Visible-regime polarimetric imager: a fully polarimeric, real-time imaging system", Applied Optics, vol. 42, No. 9, Mar. 20, 2003, pp. 1620-1628.

Lawrence B. Wolff et al., "Constraining Object Features Using a Polarization Reflectance Model", IEEE Transactions on Pattern Analysis and Machine Intelligence, vol. 13, No. 7, Jul. 1991, pp. 635-657.

* cited by examiner

DEGREE-OF-POLARIZATION IMAGE $\rho(x,y)$ (a)

POLARIZATION PHASE IMAGE $\phi(x,y)$ (b)

(a)

SPECULAR REFLECTION IMAGE (b)

DIFFUSE REFLECTION IMAGE

SPECULAR REFLECTION IMAGE
(SCHEMATIC)

(C)

DIFFUSE REFLECTION IMAGE
(SCHEMATIC)

(d)

(a) G PIXEL (b) R PIXEL (c) B PIXEL

HIGH RESOLUTION G

LOW RESOLUTION R

LOW RESOLUTION B (a)

LOW RESOLUTION R

LOW RESOLUTION B (b)

LOW RESOLUTION R

LOW RESOLUTION B

IMAGE PROCESSING APPARATUS THAT OBTAINS COLOR AND POLARIZATION INFORMATION

TECHNICAL FIELD

The present invention relates to an image processing apparatus and image input method that allow the user to obtain both color information and polarization information alike.

BACKGROUND ART

Recently, digital movie cameras have advanced so dramatically that it is expected that cellphones with a camera would achieve as high definition as an HDTV in the near future. However, if the size of an optical system or an image capture element were reduced significantly, then the basic performance of the imaging device would decline too much to maintain the minimum required level in terms of sensitivity or diffraction limit of lens. For that reason, such a high-resolution trend should hit a plateau sooner or later. Even so, however, the image quality can still be improved by compensating for the lack of image information of the object by computer graphics type processing. Nevertheless, for that purpose, pieces of physical information, including information about the three-dimensional shape of the object and information about the light source to illuminate the object, need to be collected during the image generation process. To obtain information about the shape of the object, an active sensor for projecting either a laser beam or a light beam emitted from an LED onto the object or a rangefinder system such as a differential stereo vision system is needed. However, such a sensor or system is not just bulky but also imposes various restrictions. For example, such a sensor or system allows a distance of at most several meters between the camera and the object. Besides, such a sensor or system cannot be used unless the object is a solid and bright diffusive object. Under such a restriction, the sensor or system cannot be used to shoot an object located at a distance outdoors or take a close up photo of a person with his or her hair and clothes shot as beautifully as possible.

To sense the shape of a completely passive object, polarization may be used according to some conventional technique. This technique takes advantage of the fact that the light reflected (which may be either specular reflected or diffuse reflected) from an object irradiated with non-polarized natural light will have various types of partial polarization due to geometrical factors such the surface direction and the viewpoint. To collect those sorts of information, however, the degrees of partial polarization of the respective pixels of the object should be obtained in the form of polarized images.

Non-Patent Document No. 1 discloses a camera that captures a moving picture while controlling a liquid crystal polarizer that is arranged in front of the lens of the camera. If such a camera is used, a color moving picture and information about the degrees of partial polarization of the object can be obtained in the form of images. However, this camera cannot obtain a single piece of polarization information until several frames are shot with the polarization main axes of the polarizer changed by applying a voltage to the liquid crystal layer. That is why a time lag of several frames is inevitable between the color image and the polarized image. In other words, these two images cannot be obtained at the same time. This technique is equivalent to a technique for rotating a polarizer with some mechanism.

Non-Patent Documents Nos. 2 and 3 disclose that a patterned polarizer with multiple different polarization main axes is spatially arranged in an image capture element in order to obtain light intensity images and images representing the degrees of partial polarization of the object. As the patterned polarizer, either a photonic crystal or a structure birefringence wave plate array may be used. According to these techniques, however, just a monochrome image and a polarized image can be obtained at the same time.

Patent Document No. 1 teaches arranging a polarization filter for some of G pixels in a Bayer color mosaic, thereby giving polarization property to a part of an image capture element and obtaining a color image and polarization information at the same time. According to this technique, an image with reduced specular reflection components is obtained from a color image. However, since a difference between two different polarization pixels is simply calculated, information about the degree of partial polarization of the object cannot be obtained perfectly.

Patent Document No. 1: Japanese Patent Application Laid-Open Publication No. 2006-254331

Non-Patent Document No. 1: Lawrence B. Wolff, "Polarization Vision: A New Sensory Approach to Image Understanding", Image and Vision Computing 15 (1997), pp. 81-93, Elsevier Science B. V.

Non-Patent Document No. 2: Kawashima, Sato, Kawakami, Nagashima, Ota and Aoki, "Development of Polarization Imaging Device and Applications by Using Patterned Polarizer", Institute of Electronics, Information and Communication Engineers of Japan, National Conference 2006, No. D-11-52, p. 52, March 2006.

Non-Patent Document No. 3: Kikuta and Iwata, "Polarized Image Measuring System", Oplus E, Vol. 25, No. 11, pp. 1241-1247, 2003

DISCLOSURE OF INVENTION

Problems to be Solved by the Invention

However, according to none of the conventional techniques described above, a color image of the object and a polarized image representing the degree of partial polarization of the object can be obtained at the same time. Thus, it has been impossible to obtain a color moving picture and shape information with no time lag left between them.

According to some of those conventional techniques, a monochrome light intensity image and a polarized image can be obtained at the same time. However, to represent the image in colors, polarization information needs to be obtained about the three wavelength bands of R, G and B. To achieve this object, however, the following problems should be overcome:

1) the color separation property and the polarization property will interfere with each other; and
2) it is difficult to obtain color light intensities and polarization information at the same time.

The interference between the color separation property and the polarization property is caused because an optical system such as a polarizer or a polarization beam splitter normally has such a physical property that the polarization separation property thereof varies significantly with the wavelength and cannot exhibit the same characteristic in the entire wavelength range of visible radiation. For example, a polarization beam splitter can separate an incoming non-polarized light ray into a P wave and an S wave in a particular wavelength range but does not operate outside of that wavelength range. Likewise, a non-polarization half mirror can separate a light ray with a particular wavelength without changing the polarization properties. In a broad wavelength range, however, the mirror also separates the light ray with the polarization properties changed. This will also cause a side effect that the polarization state of an incoming light ray affects the color separation property. That is why the polarizer cannot be used as easily as in a monochrome image but the performance should be optimized such that desired polarization property is realized in a narrow wavelength range associated with each of the colors to use.

If it is difficult to obtain color light intensities and polarization information at the same time, then the color light intensity information and polarization information cannot be obtained independently of each other but will be mixed up with each other. The greater the number of polarization axes on which the light intensities are measured, the higher the precision of the polarization information obtained. However, considering the system configuration currently available, it is difficult to obtain a lot of polarization information in a single color. That is why pieces of polarization information that have been distributed among multiple different colors need to be integrated together by a certain method.

In order to overcome the problems described above, the present invention has an object of providing an image processing method and an image input method that allow the user to obtain a color image and polarization information at the same time.

Means for Solving the Problems

An image processing apparatus according to the present invention includes: a color and polarization obtaining section including a single-chip color image capture element with a color mosaic filter and a patterned polarizer in which a number of polarizer units, of which the polarization transmission planes define mutually different angles, are arranged adjacent to each other within each single color pixel of the color mosaic filter; a polarization information processing section for approximating, as a sinusoidal function, a relation between the intensity of light rays that have been transmitted through the polarizer units within each said single color pixel and the angles of the polarization transmission planes of the polarizer units; and a color information processing section for getting average color intensity information by averaging the intensities of the light rays that have been transmitted through the polarizer units within each said single color pixel.

Another image processing apparatus according to the present invention includes: a color and polarization obtaining section including a color separation element for separating incident light into light rays in multiple different colors and a plurality of image capture elements that receive the light rays in multiple different colors produced by the color separation element; polarization information processing section for obtaining polarization information based on the outputs of the image capture elements; and color information processing section for getting average color intensity information based on the outputs of the image capture elements. The image capture elements include at least one high-resolution image capture element for obtaining a high-resolution single-color image based on a light ray in a first color that is included in the multiple different colors separated, and at least one low-resolution image capture element for obtaining a low-resolution image based on a light ray in a second color that is also included in the multiple different colors separated. The low-resolution image capture element includes a patterned polarizer in which a number of polarizer units, of which the polarization transmission planes are defined in mutually different directions, are arranged adjacent to each other. The polarization information processing section obtains the polarization information by integrating together the intensities of the light rays that have been transmitted through the polarizer units.

In one preferred embodiment, the color separation element separates the incident light into R, G and B rays, and the high-resolution single-color element receives the G ray.

In another preferred embodiment, the wavelength dependences of polarization in the polarizer units that are used for each single color pixel are substantially equal to each other within a wavelength range associated with that color.

In still another preferred embodiment, the patterned polarizer includes (180/θ) different types of polarizer units, of which the polarization transmission planes define various angles that are different from each other by θ degrees, for each said pixel.

In yet another preferred embodiment, the at least one low-resolution image capture element includes a plurality of low-resolution image capture elements. A plurality of patterned polarizers, associated with those low-resolution image capture elements, includes a total of (180/θ) different types of polarizer units, of which the polarization transmission planes define various angles that are different from each other by θ degrees.

Still another image processing apparatus according to the present invention includes: a color and polarization obtaining section including a color separation element for separating incident light into light rays in multiple different colors, a plurality of polarization beam splitters that receive the light rays in multiple different colors that have been produced by the color separation element, and a plurality of image capture elements that includes a pair of image capture elements for receiving light rays that have been reflected from, or transmitted through, the respective polarization beam splitters; a polarization information processing section for obtaining polarization information based on the outputs of the image capture elements; and a color information processing section for getting average color intensity information based on the outputs of the image capture elements. The polarization information processing section obtains the polarization information by integrating together the intensities of the light rays that have been incident on the image capture elements.

In one preferred embodiment, the polarization transmission planes of the polarization beam splitters define mutually different angles.

In this particular preferred embodiment, the angles defined by the polarization transmission planes of the polarization beam splitters are different from each other by ±30 degrees.

In another preferred embodiment, the polarization information processing section multiplies the measured intensities of different polarized light rays that have been produced with respect to multiple different colors by a correction coefficient, thereby obtaining a corrected intensity value with respect to one color.

An image input method according to the present invention includes the steps of: obtaining measured values of color polarization information for R, G and B images; integrating together the intensities of the color images in mutually different polarization states into an intensity for a single color using a correction coefficient; approximating a variation in intensity, which has been integrated on a pixel-by-pixel basis, as a sinusoidal function; generating a degree-of-polarization image based on the maximum and minimum values of the sinusoidal function; and calculating the average intensity of the R, G and B images, thereby generating a color intensity image.

Effects of the Invention

An image processing apparatus according to the present invention can obtain a color image and polarization information at the same time by eliminating interference between the color separation property and the polarization separation property and by getting the color intensity and polarization monitored simultaneously on an image capturing system.

Figure 3:
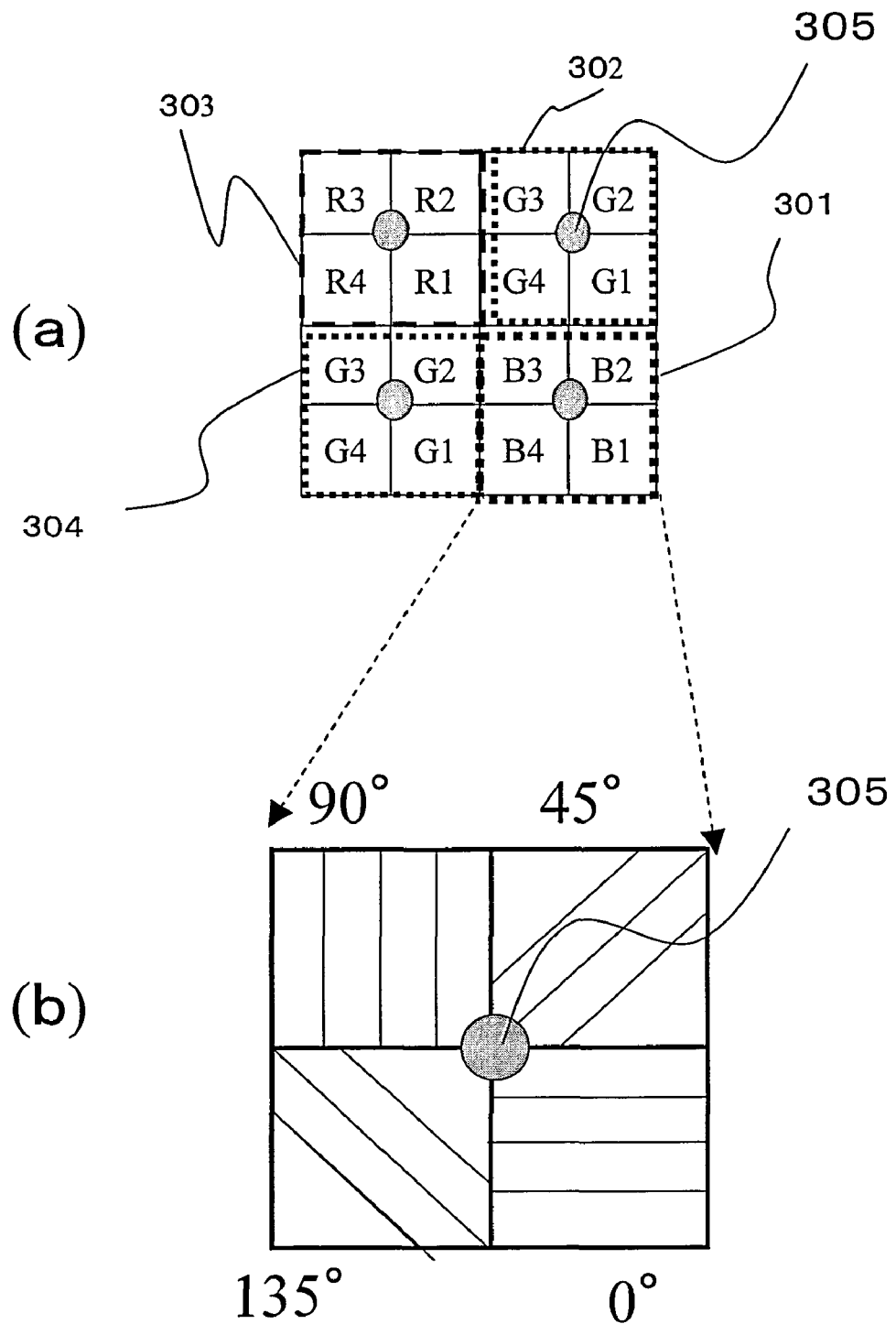

Portions (a) and (b) of FIG. 3 illustrate an exemplary combined arrangement for a color filter and a patterned polarizer according to the first preferred embodiment.

Figure 4:
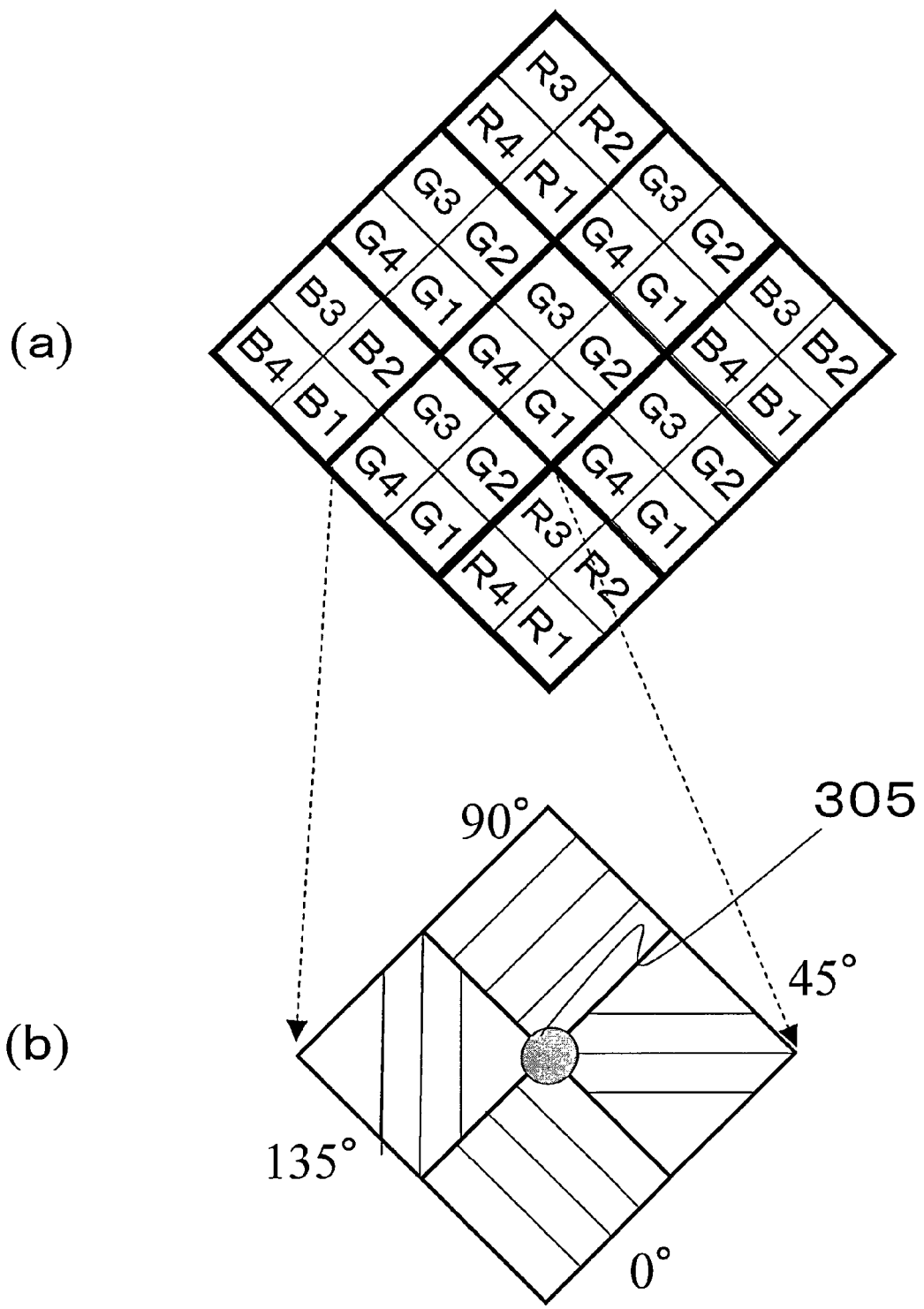

Portions (a) and (b) of FIG. 4 illustrate another exemplary combined arrangement for a color filter and a patterned polarizer according to the first preferred embodiment.

Figure 5:
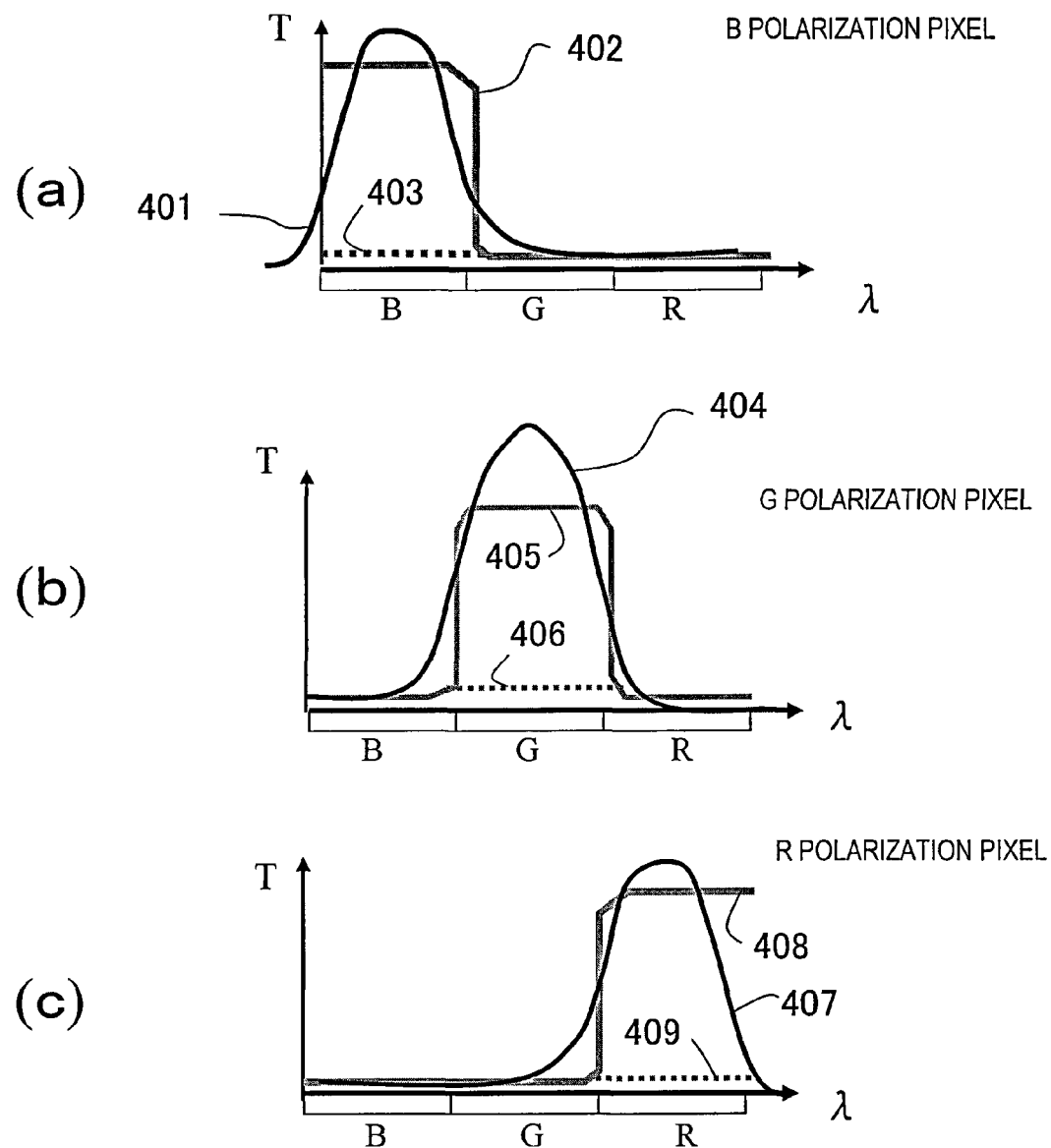

FIGS. 5(*a*) through 5(*c*) show the wavelength characteristics of the patterned polarizers of the first preferred embodiment.

Figure 6:
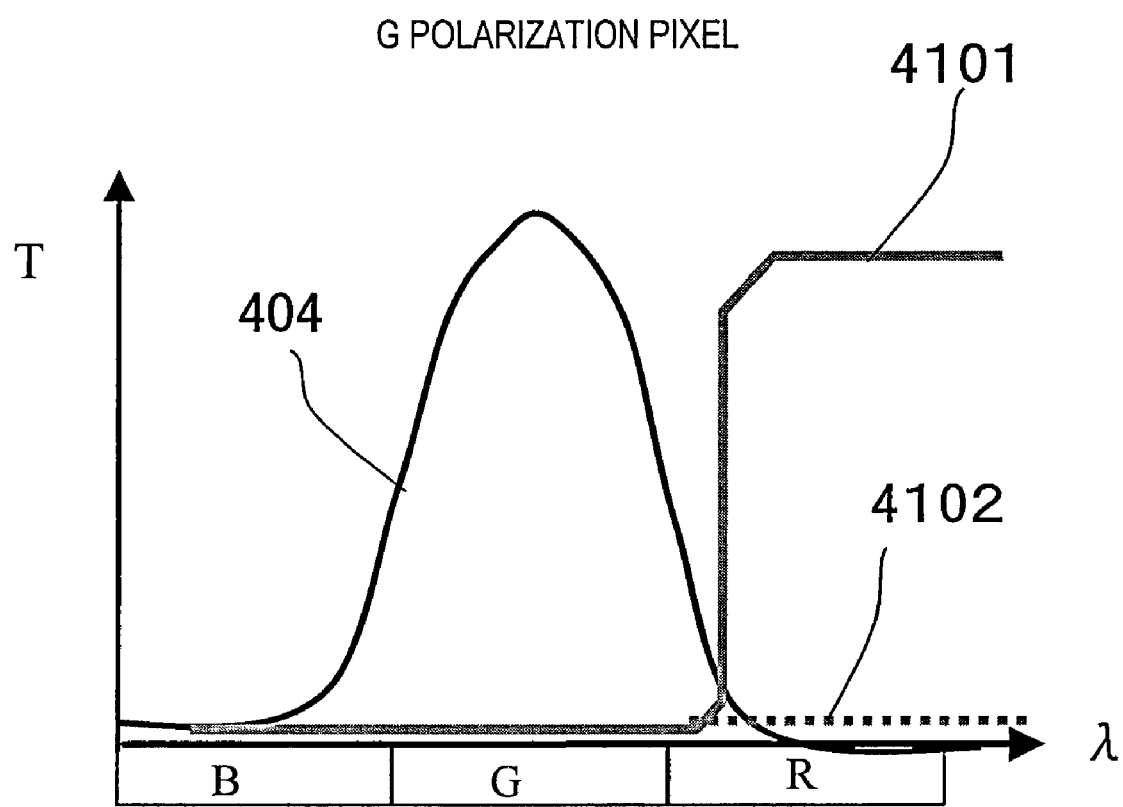

FIG. 6 shows how the color separation property and polarization separation property of a patterned polarizer interfere with each other.

Figure 7:
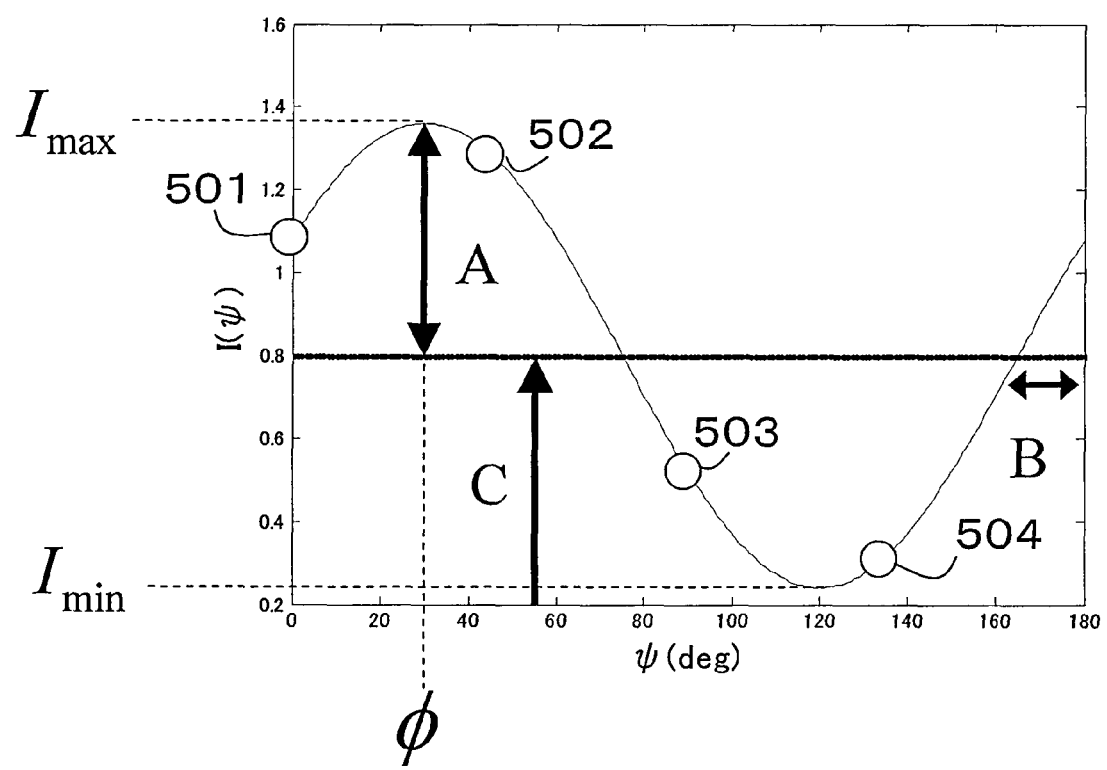

FIG. 7 schematically shows an intensity variation like a sinusoidal function along with intensity measuring points.

Figure 8:
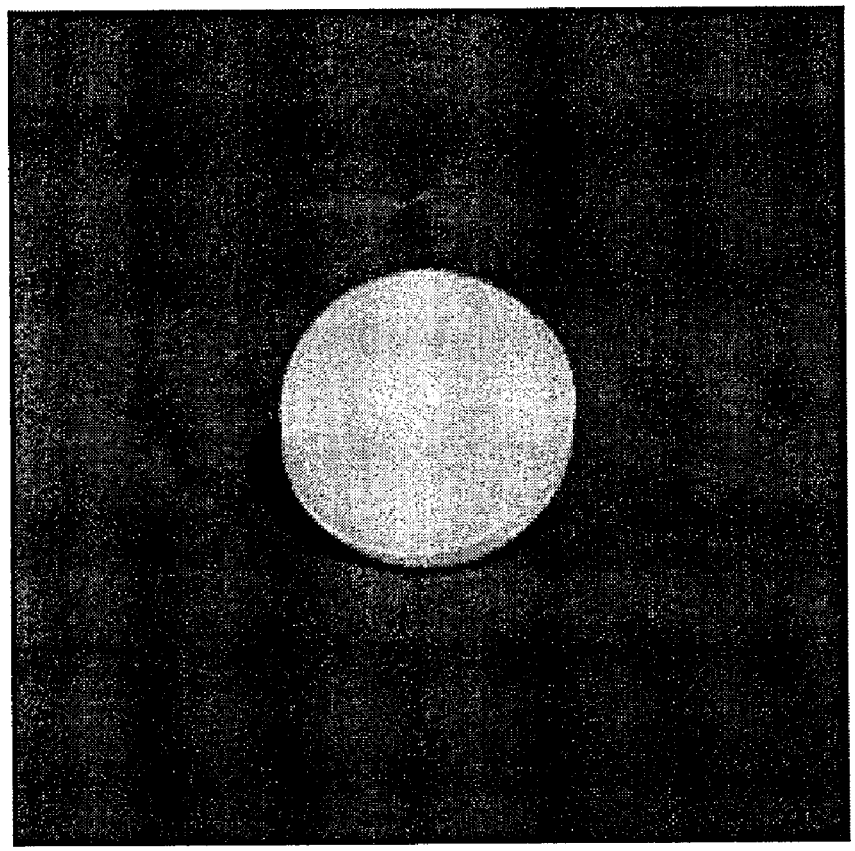

FIG. 8 shows a plastic ball as an object.

Figure 9:
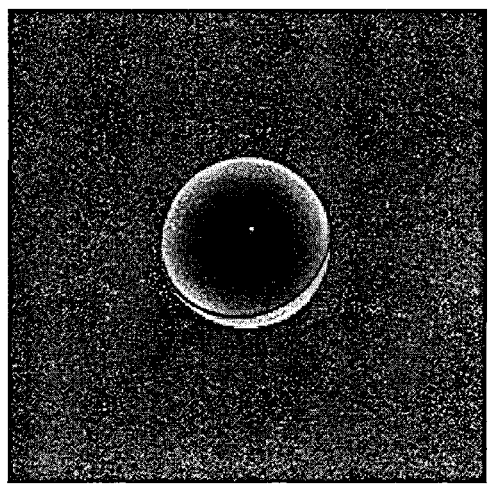
Figure 9:
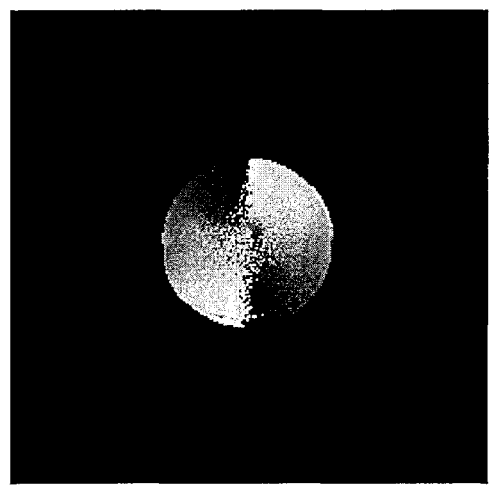

FIGS. 9(*a*) and 9(*b*) show a degree-of-polarization image ρ (x, y) and a polarization phase image φ (x, y), respectively.

Figure 10:
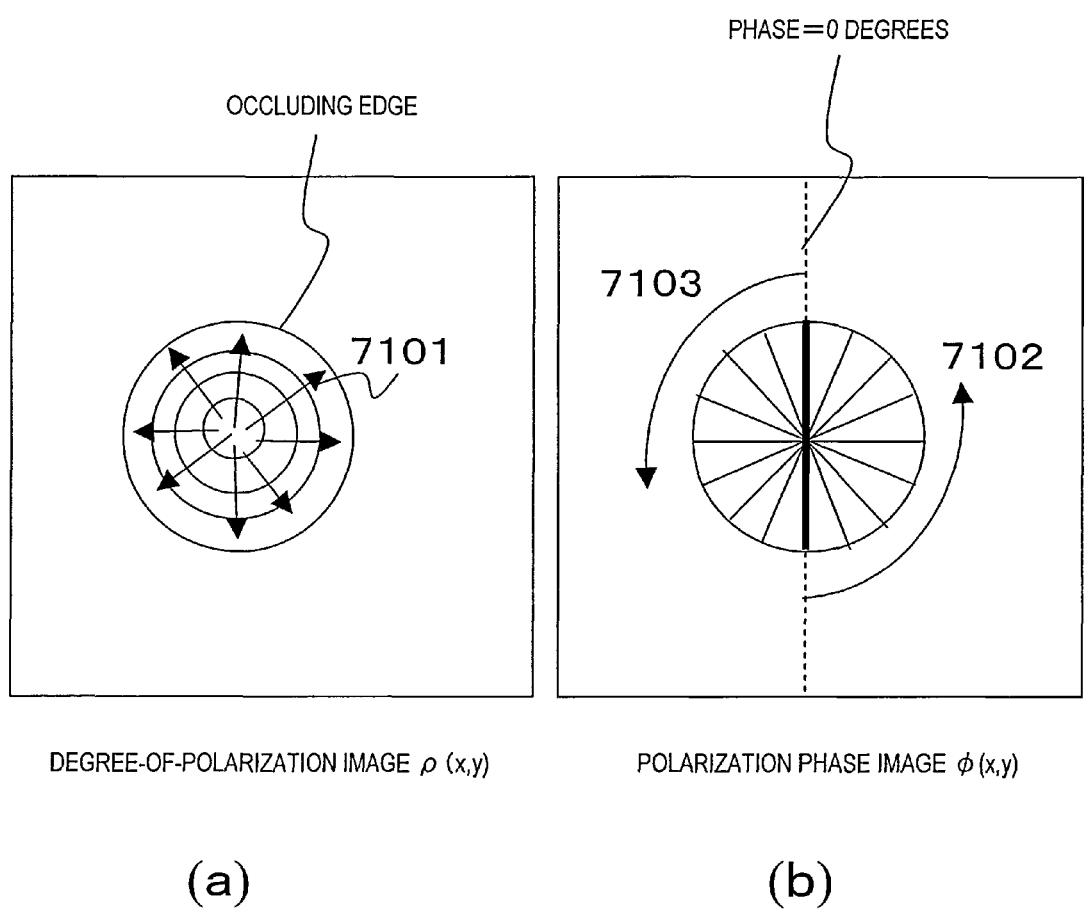

FIGS. 10(*a*) and 10(*b*) are schematic representations illustrating the degree-of-polarization image ρ (x, y) and the polarization phase image φ (x, y), respectively.

Figure 11:
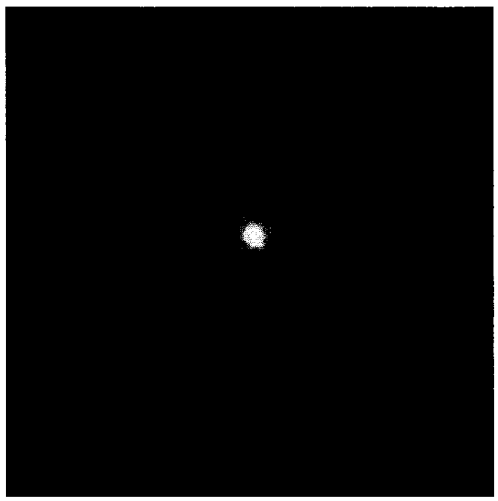
Figure 11:
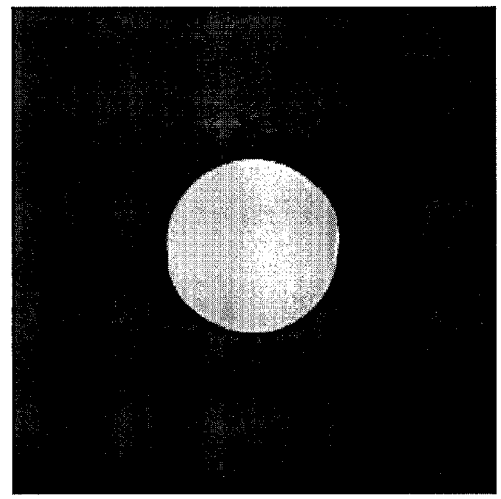
Figure 11:
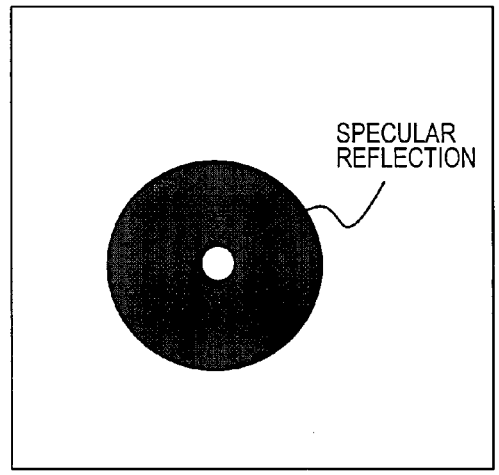

FIGS. 11(*a*) and 11(*b*) are photographs showing a specular reflection image and a diffuse reflection image, respectively, and FIGS. 11(*c*) and 11(*d*) are schematic representations thereof.

Figure 12:
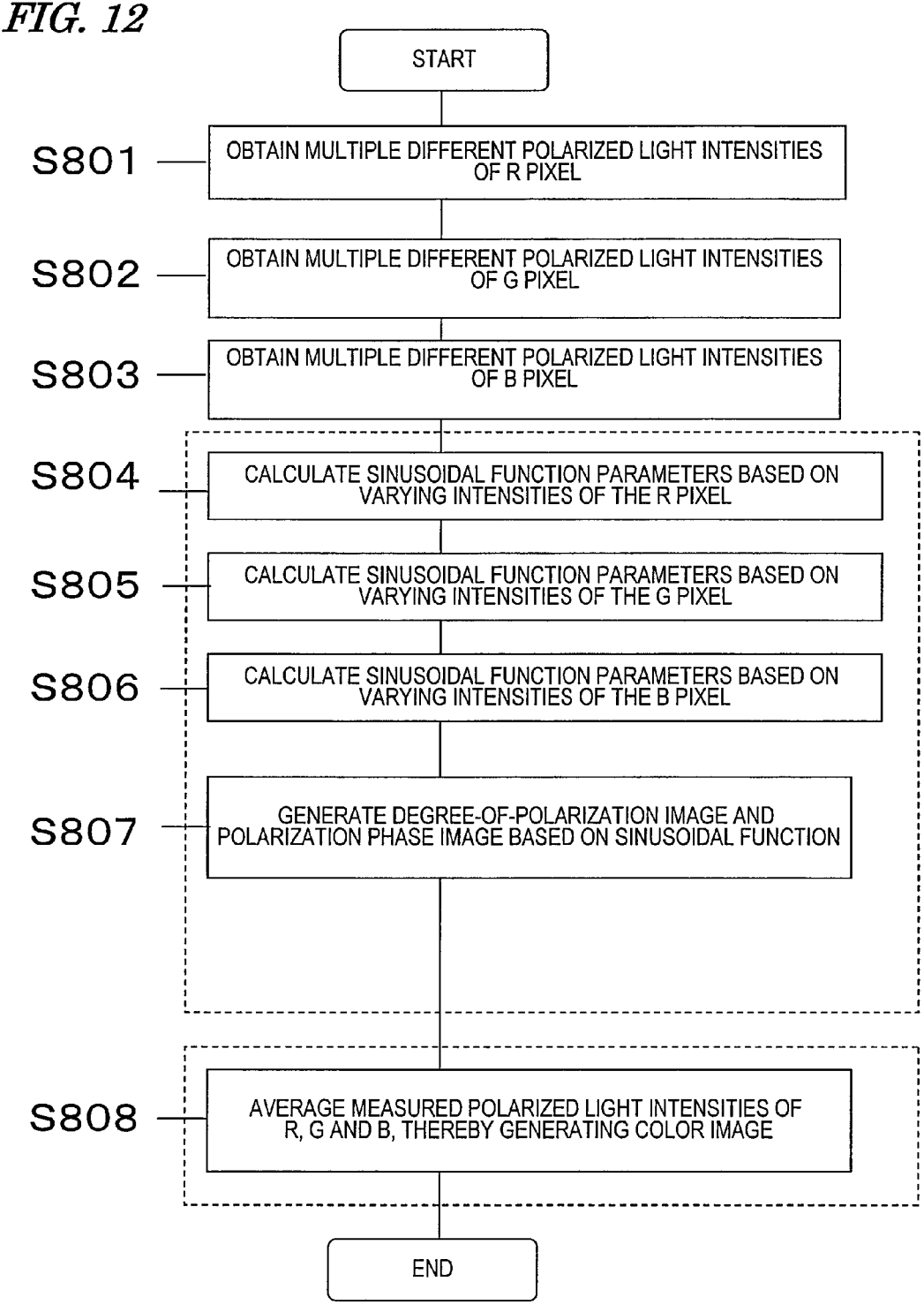

FIG. 12 is a flowchart showing how the polarization information processing section and color information processing section of the first preferred embodiment operate.

Figure 13A:
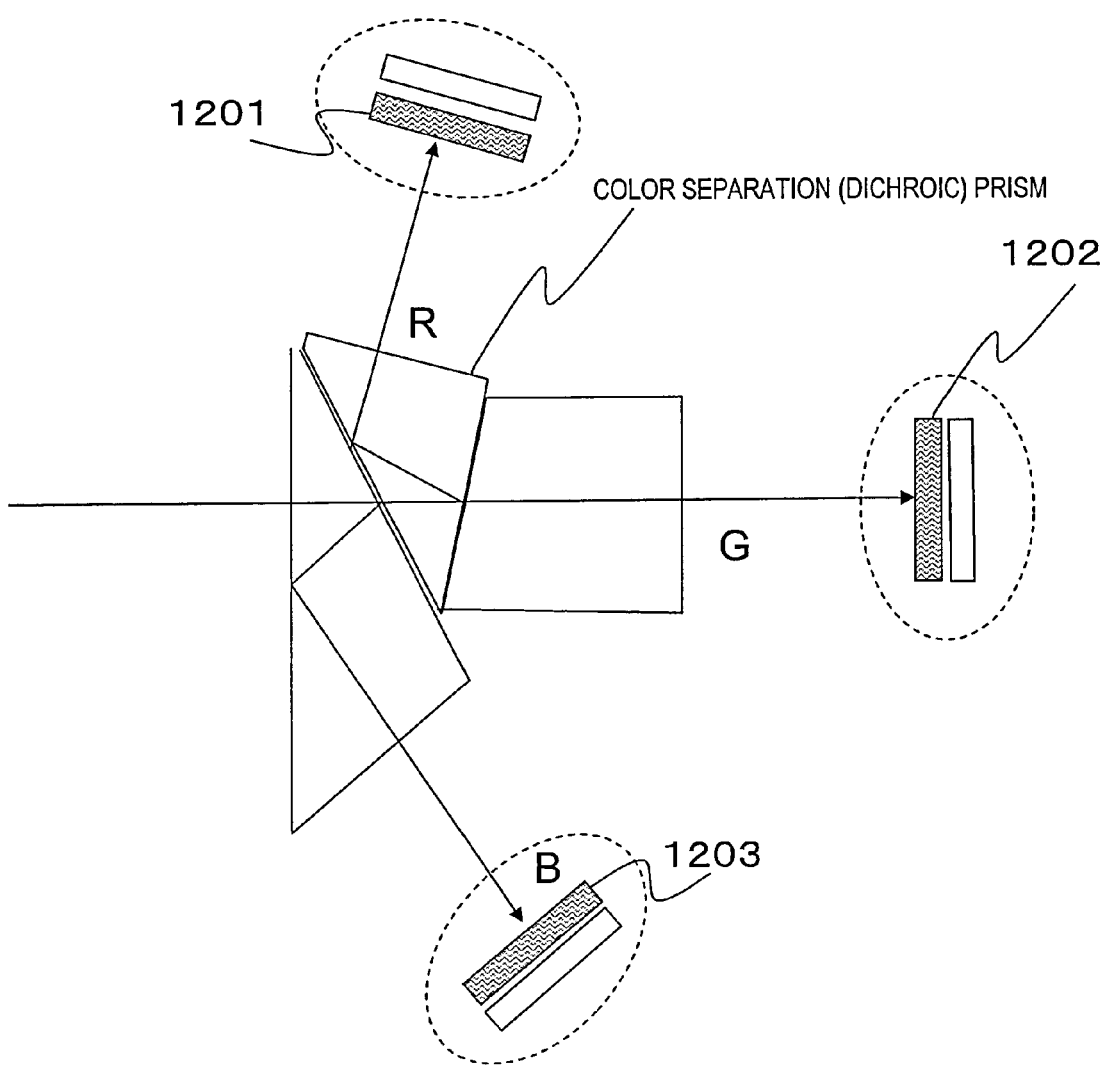

FIG. 13A illustrates an exemplary configuration for a color and polarization obtaining section.

Figure 13B:
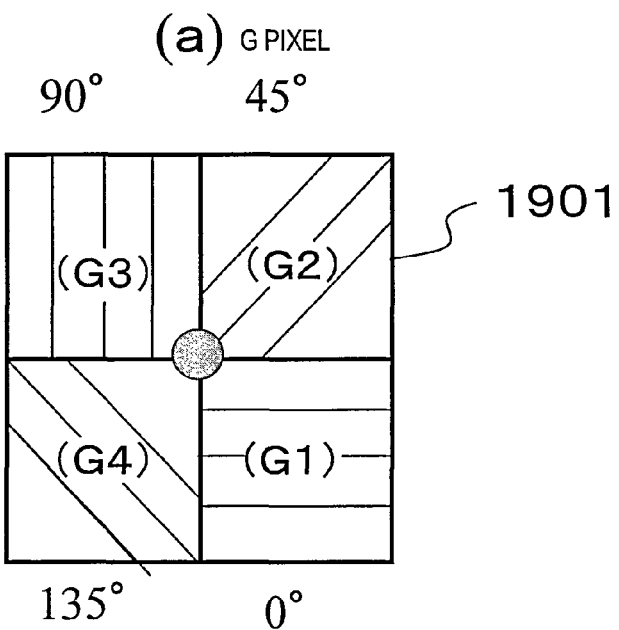
Figure 13B:
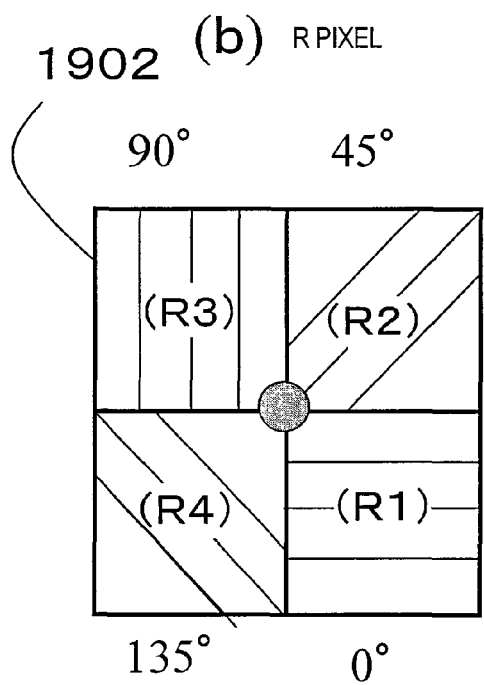
Figure 13B:
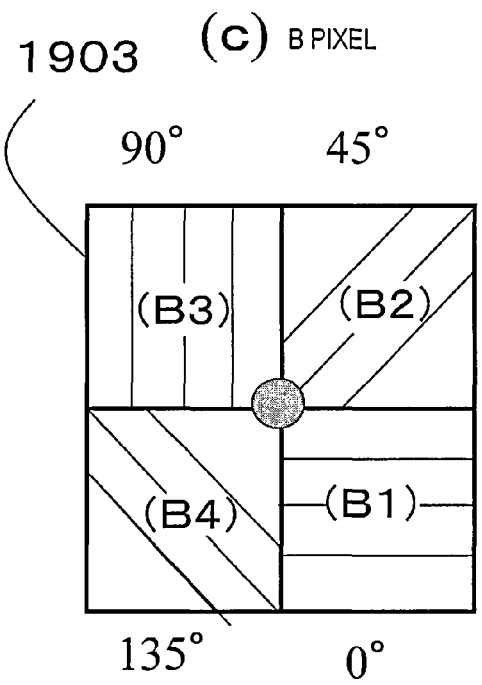

FIGS. 13B(a) to 13B(c) illustrate the arrangements of G, R and B patterned polarizers in the exemplary configuration shown in FIG. 13A.

Figure 13C:
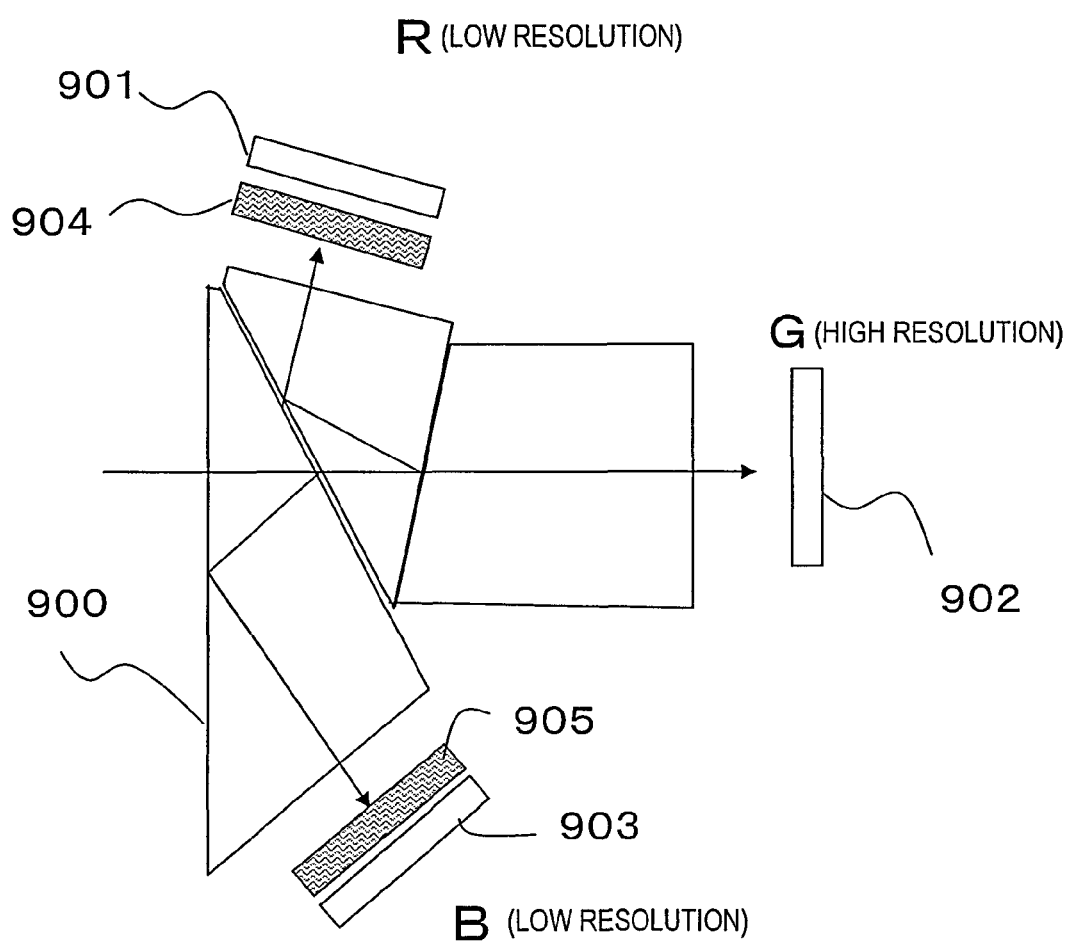

FIG. 13C illustrates a configuration for a color and polarization obtaining section according to a second preferred embodiment of the present invention.

Figure 14:
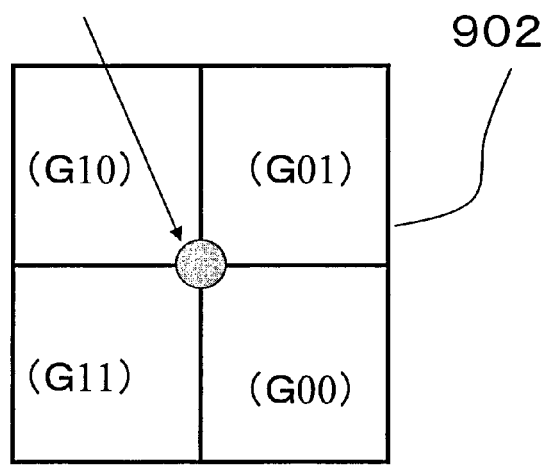
Figure 14:
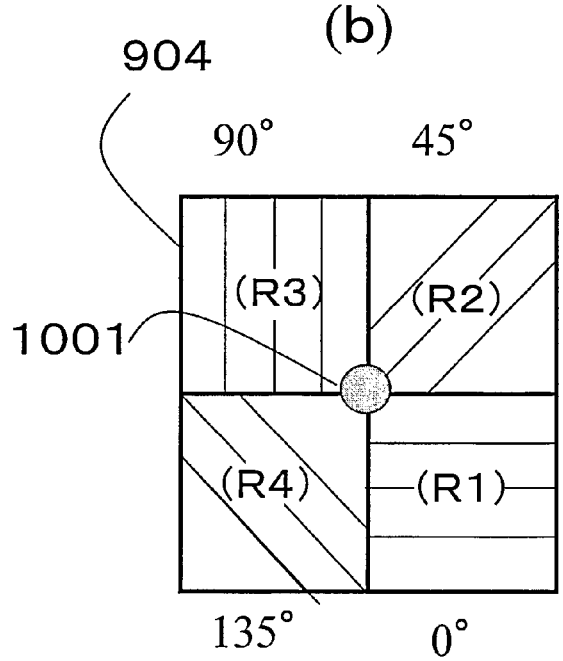
Figure 14:
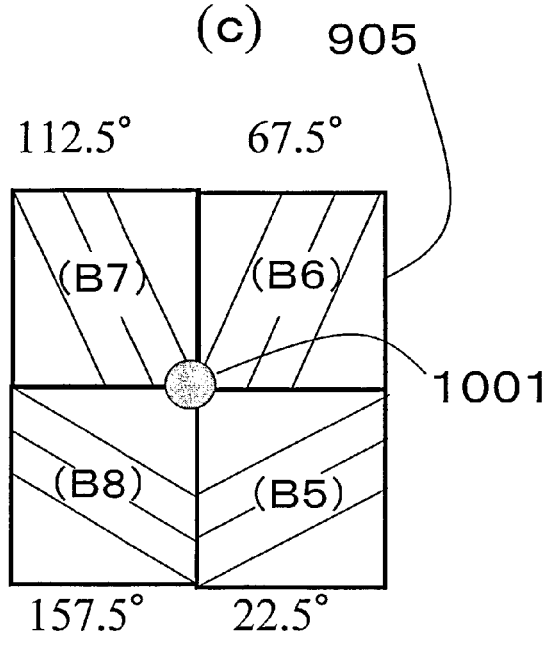

FIGS. 14(*a*) to 14(*c*) illustrate arrangements of R and B patterned polarizers according to the second preferred embodiment.

Figure 15:
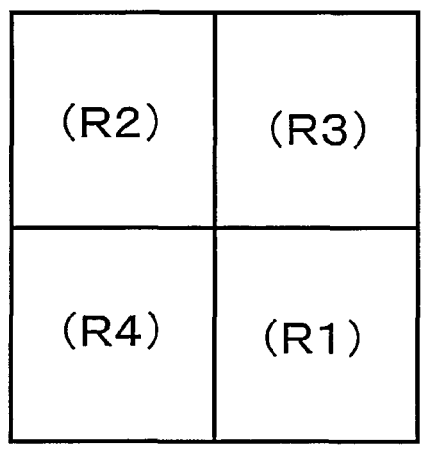
Figure 15:
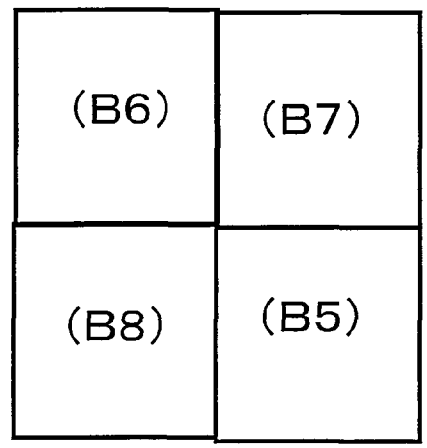
Figure 15:
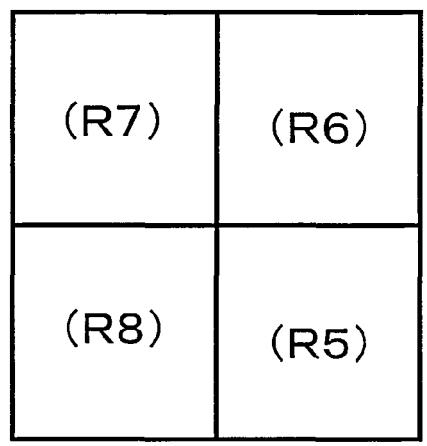
Figure 15:
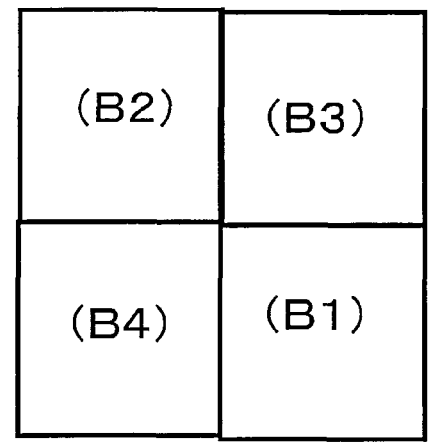

FIGS. 15(*a*) and 15(*b*) illustrate alternative arrangements of R and B patterned polarizers according to the second preferred embodiment.

Figure 16:
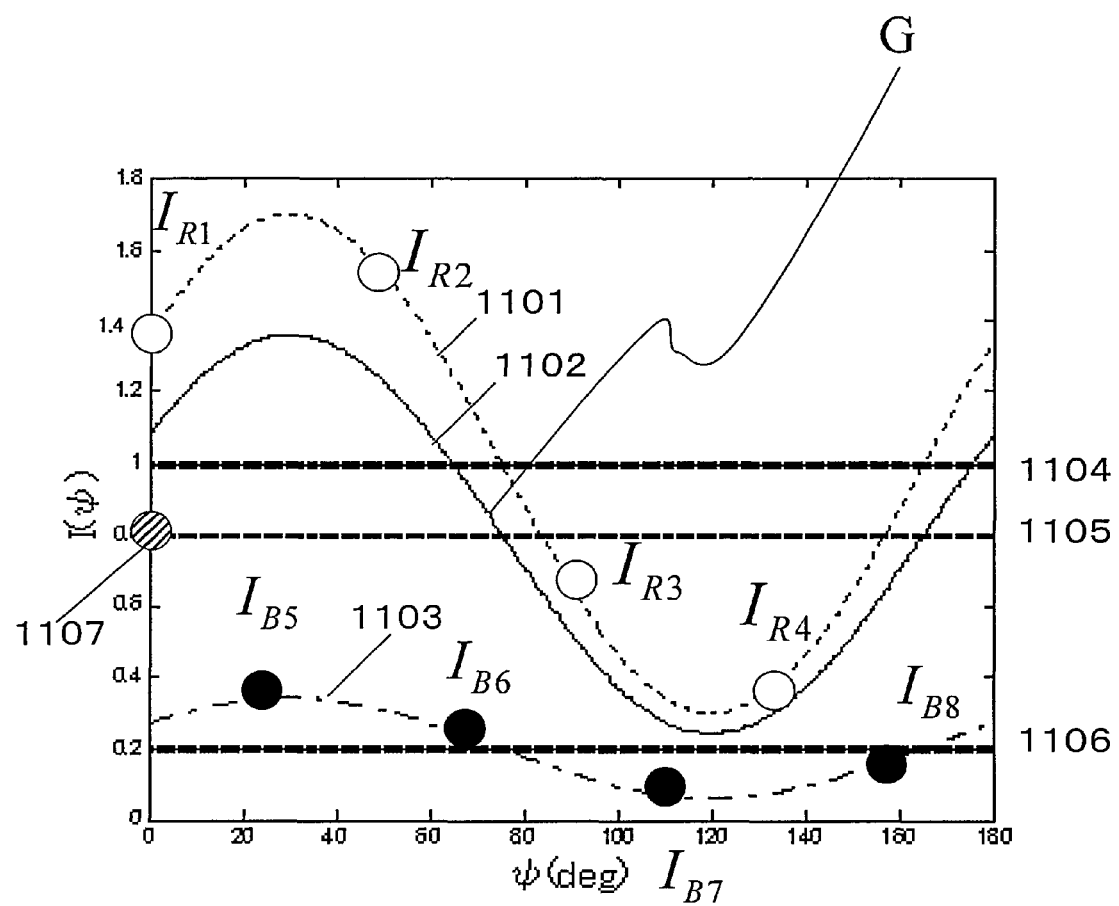

FIG. 16 schematically shows an intensity variation like a sinusoidal function along with intensity measuring points according to the second preferred embodiment.

Figure 17:
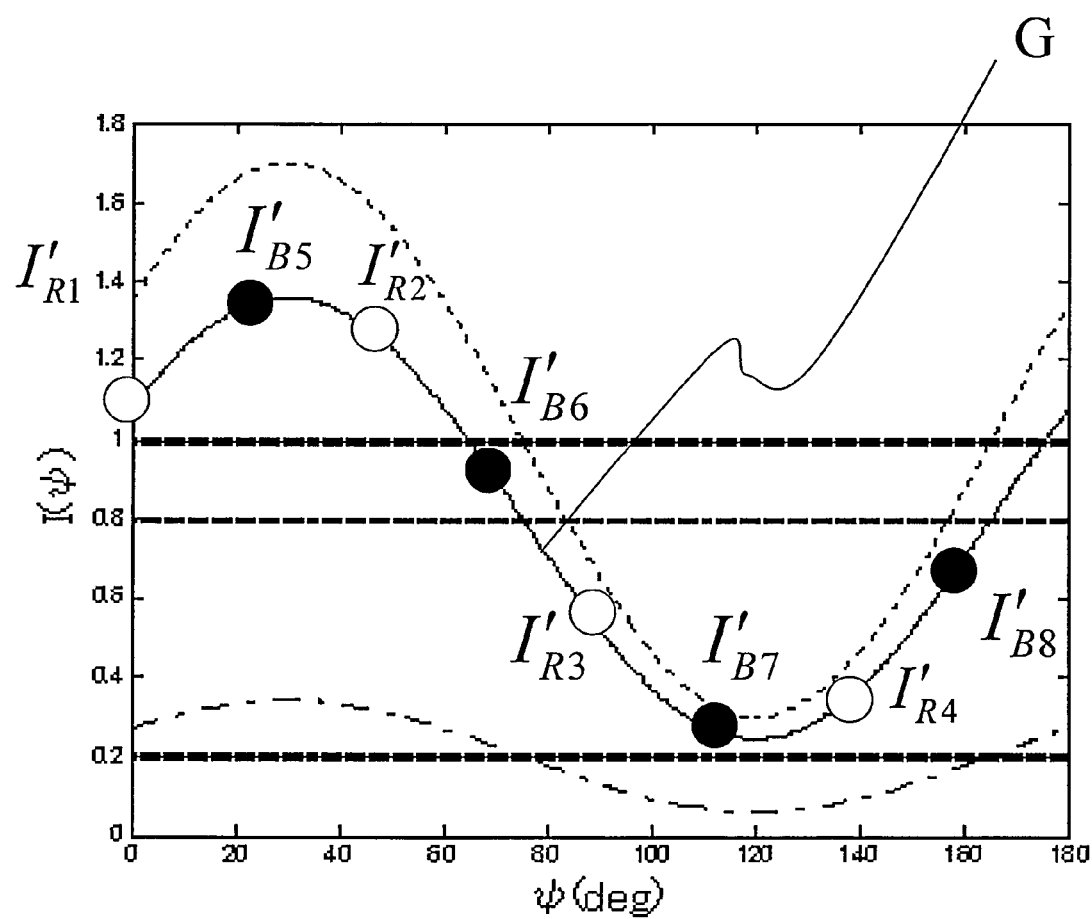

FIG. 17 shows how to integrate pieces of polarization information that are distributed in colors into G in the second preferred embodiment.

Figure 18:
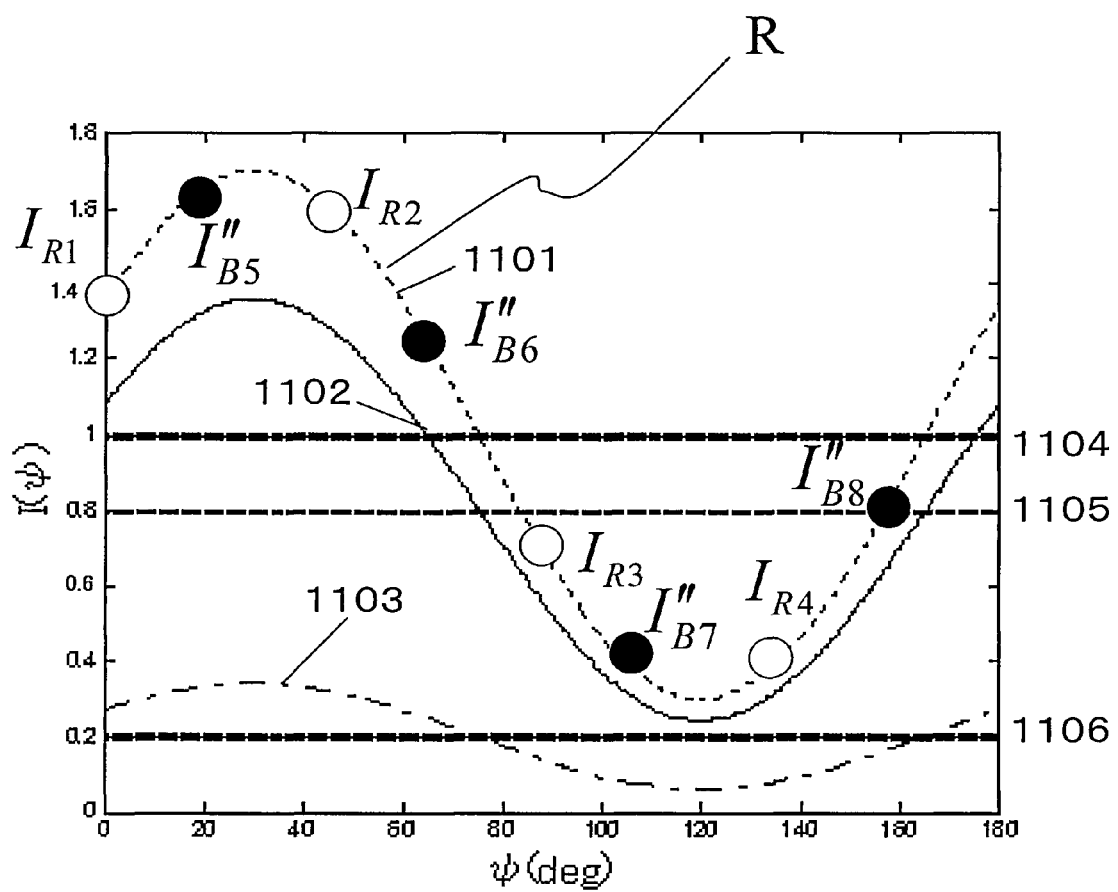

FIG. 18 shows how to integrate pieces of polarization information that are distributed in colors into R in the second preferred embodiment.

Figure 19:
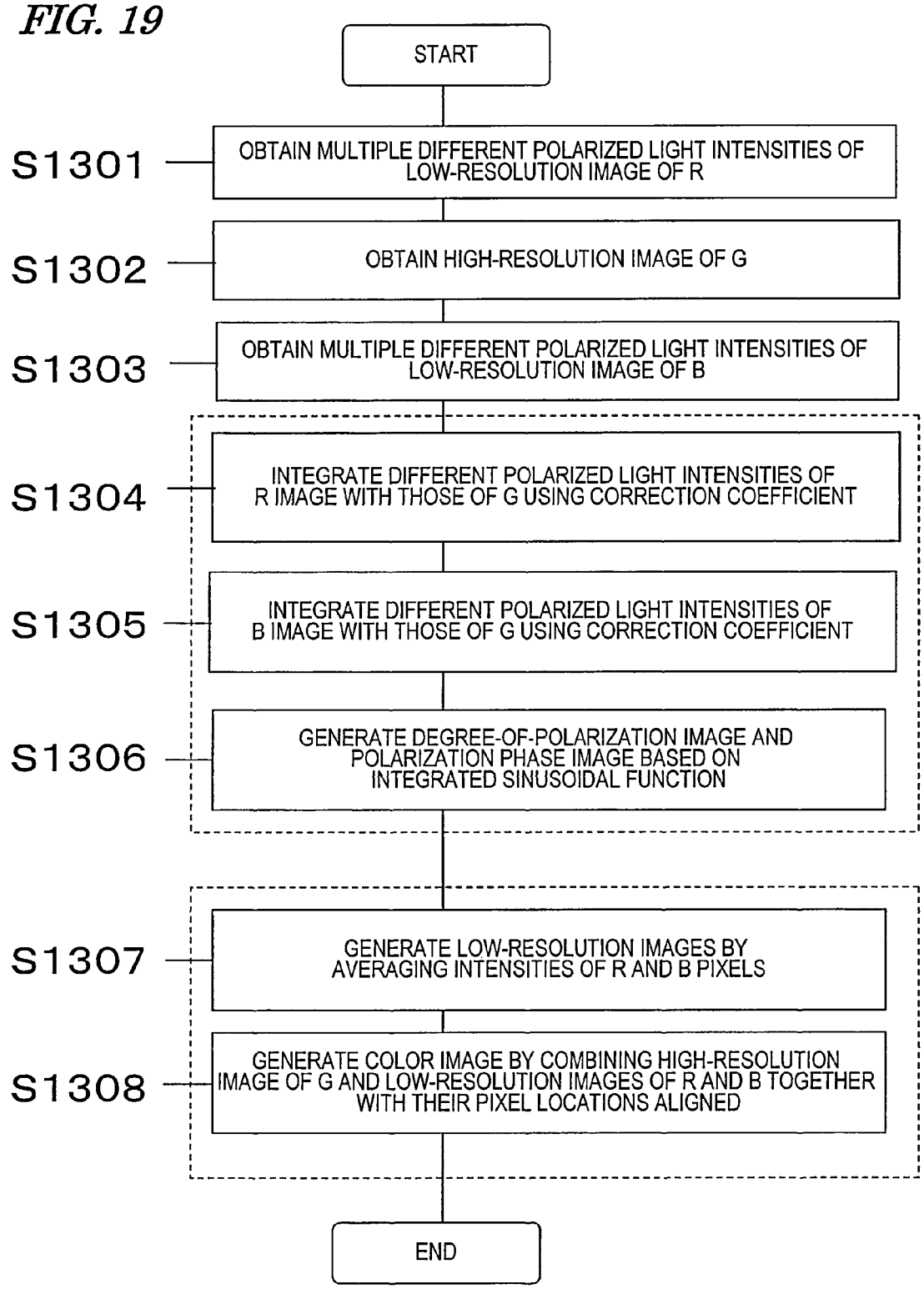

FIG. 19 is a flowchart showing how the polarization information processing section and color information processing section of the second preferred embodiment operate.

Figure 20:
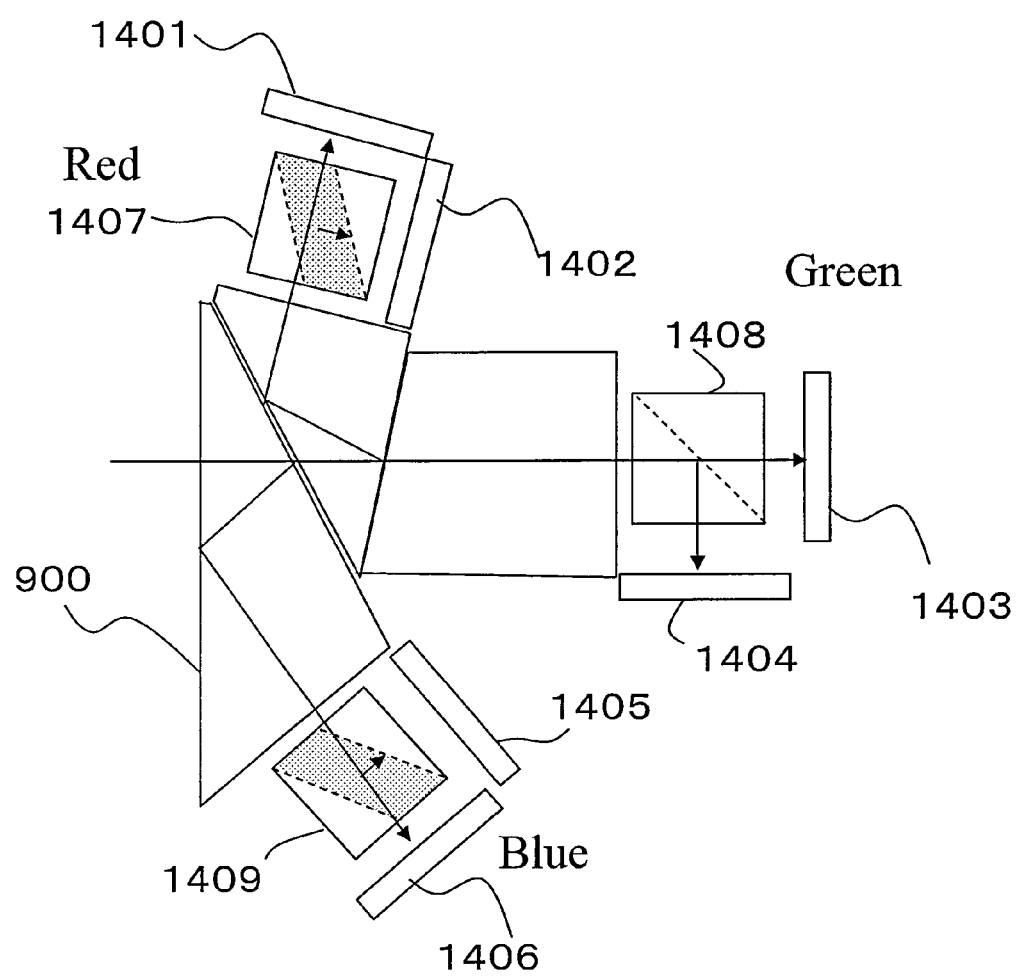

FIG. 20 illustrates a configuration for a color and polarization obtaining section according to a third preferred embodiment of the present invention.

Figure 21:
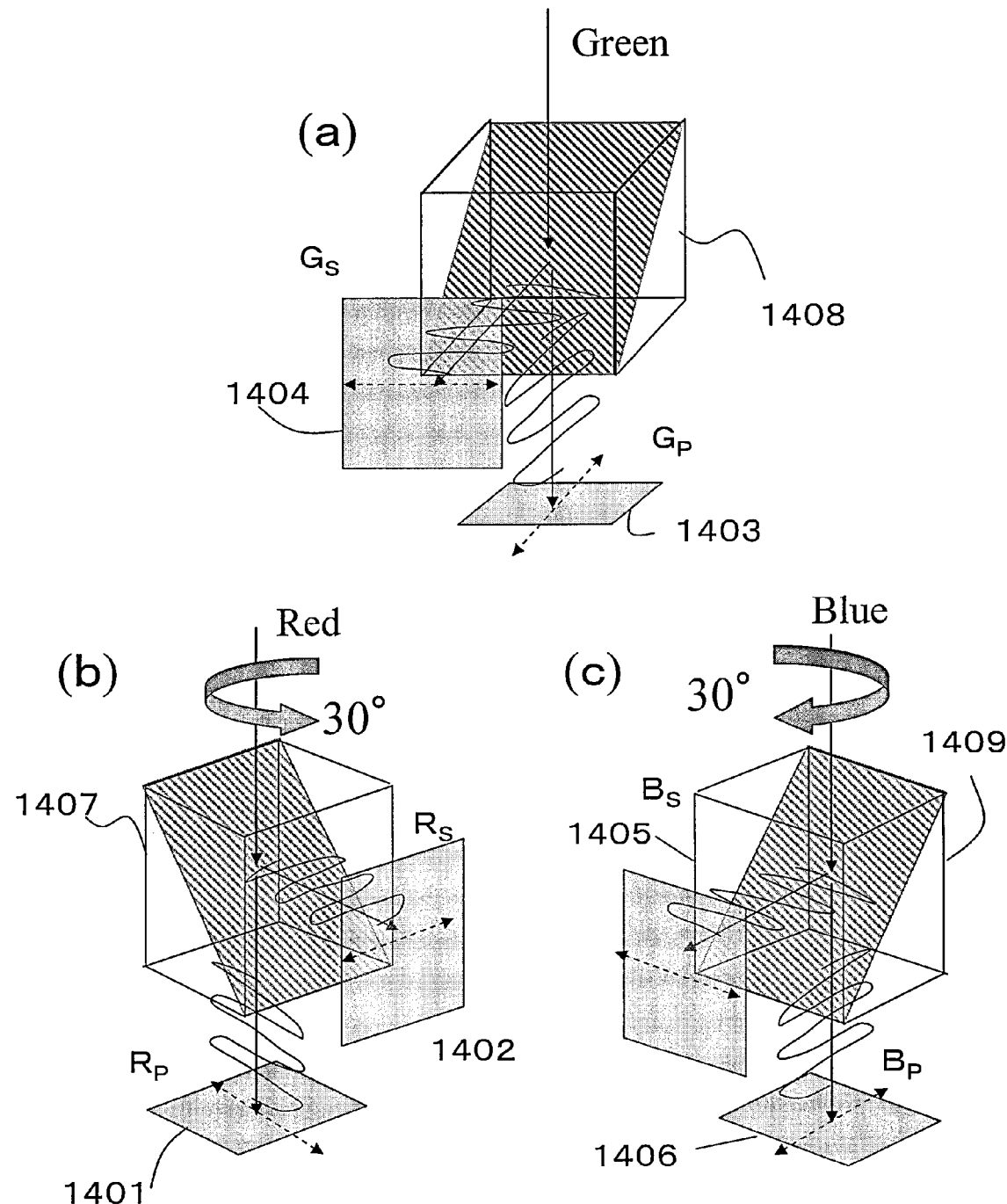

FIGS. 21(*a*) through 21(*c*) illustrate how polarization beam splitters may be arranged in the third preferred embodiment.

Figure 22:
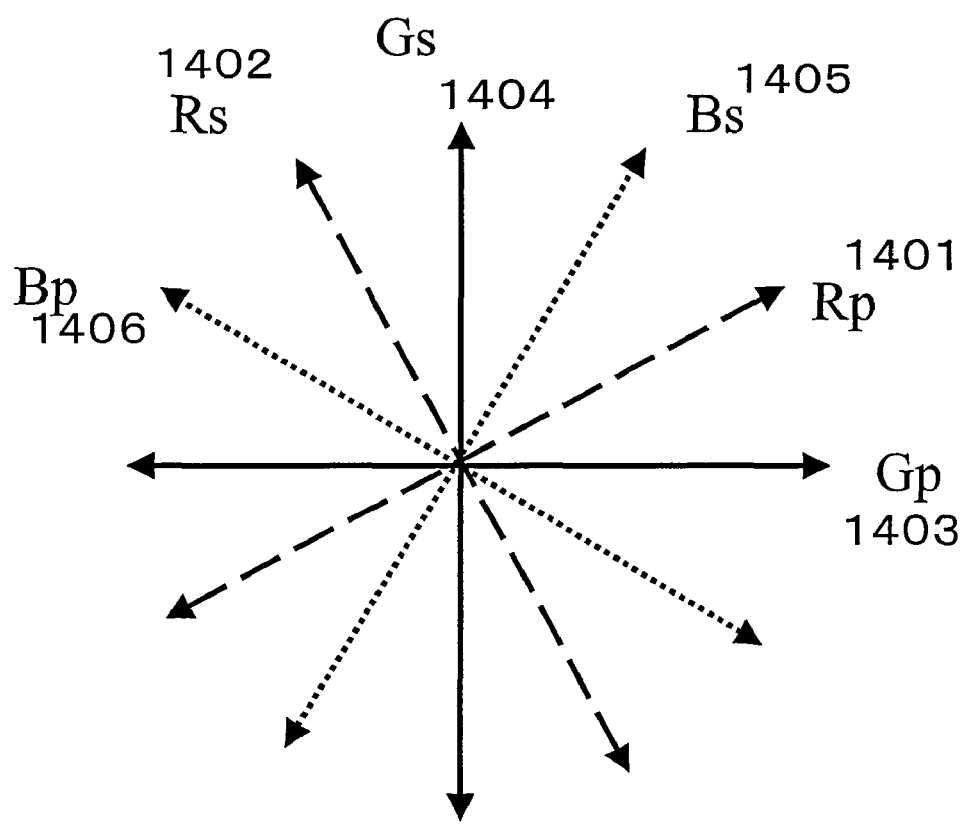

FIG. 22 shows measuring angles to collect R, G and B polarization information in the third preferred embodiment.

Figure 23:
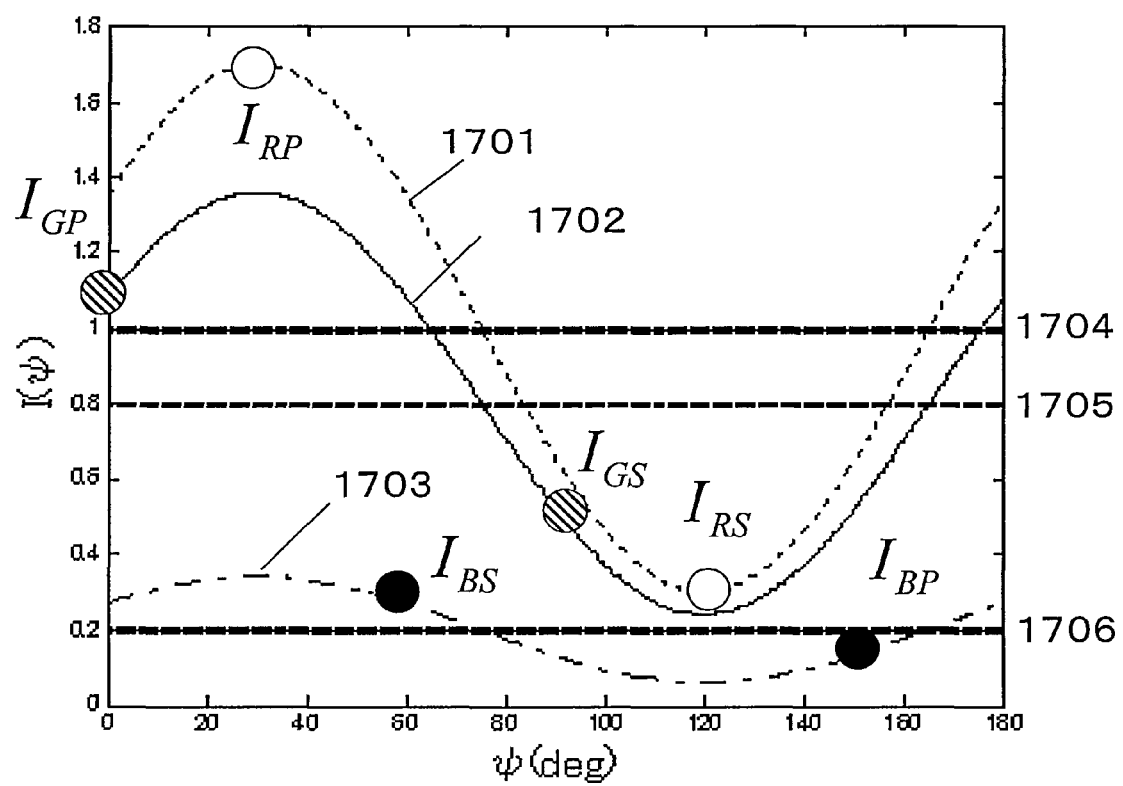

FIG. 23 schematically shows an intensity variation like a sinusoidal function along with intensity measuring points according to the third preferred embodiment.

Figure 24:
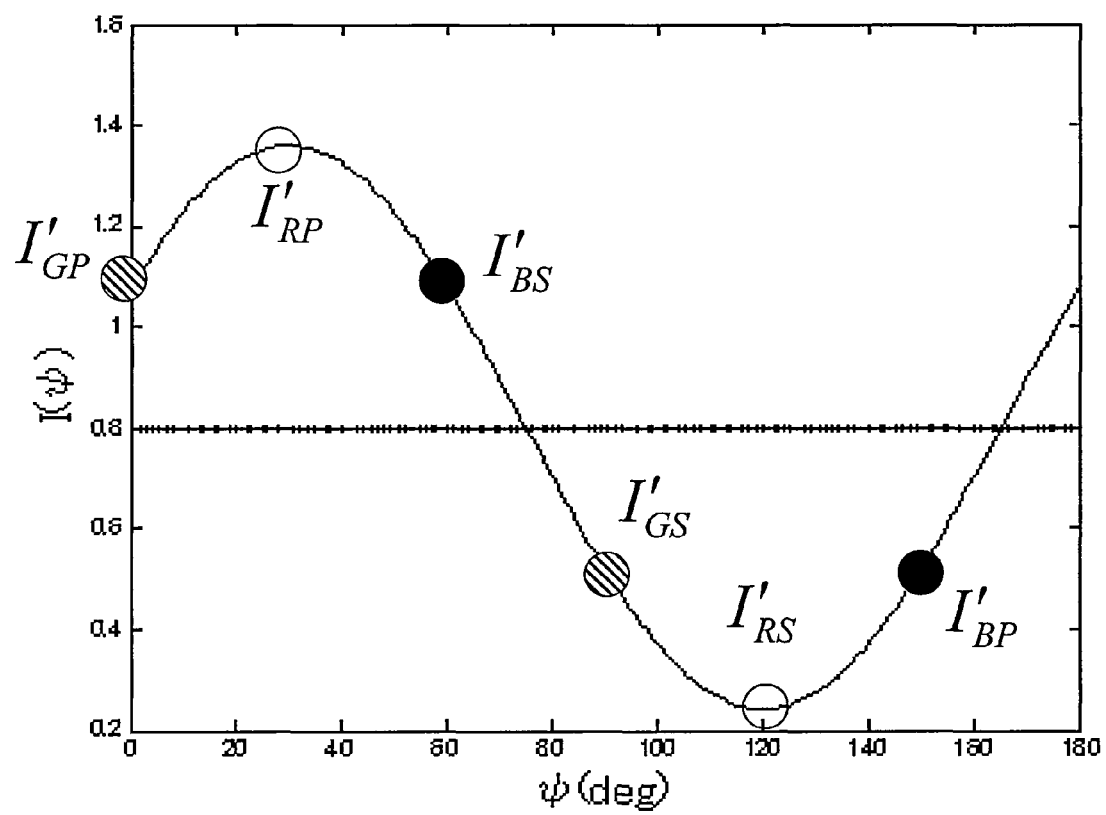

FIG. 24 shows how to integrate pieces of polarization information that are distributed in colors in the third preferred embodiment.

Figure 25:
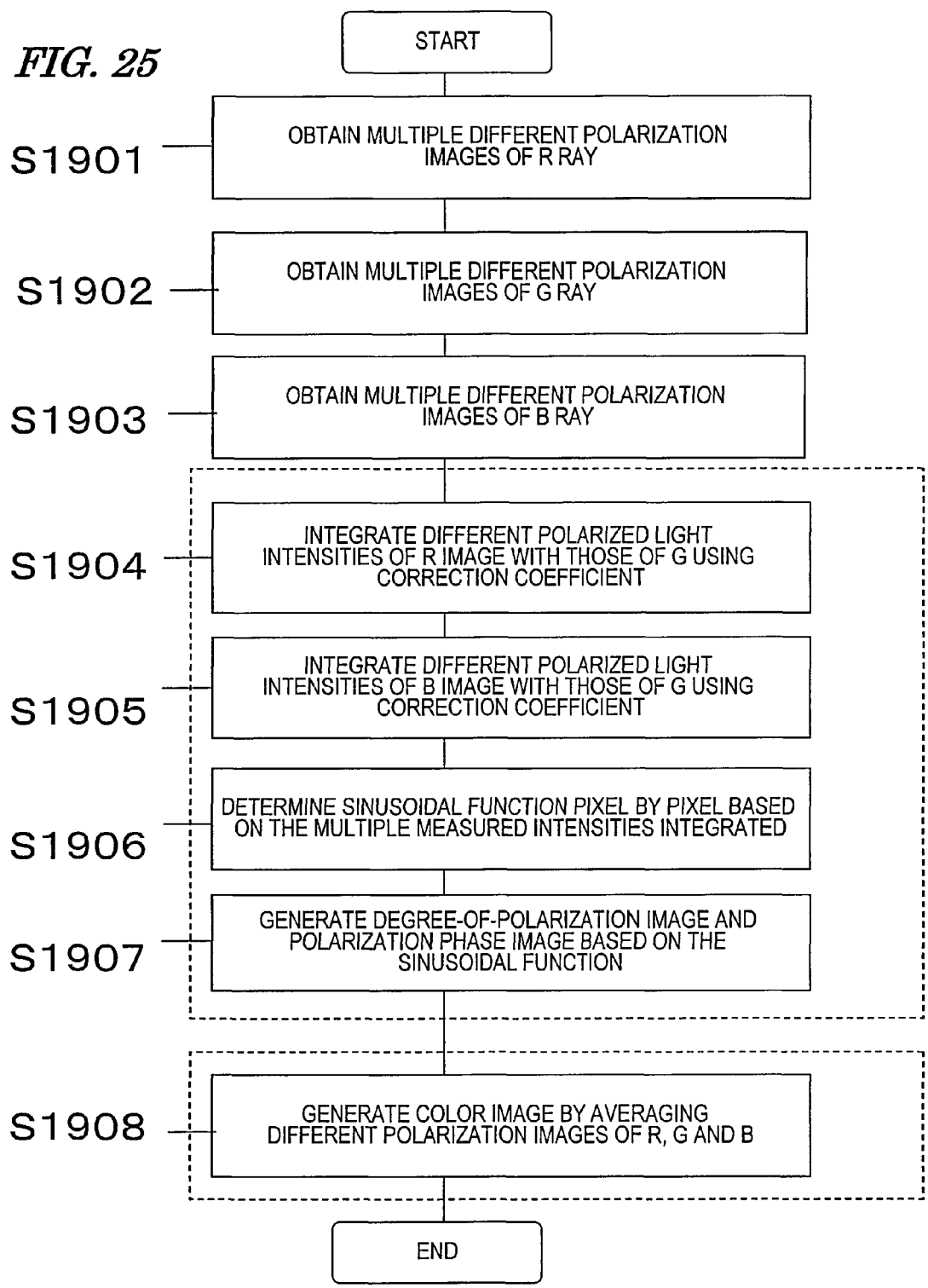

FIG. 25 is a flowchart showing how the polarization information processing section and color information processing section of the third preferred embodiment operate.

DESCRIPTION OF REFERENCE NUMERALS

100*a* lens
100*b* diaphragm
101 color and polarization obtaining section
102 polarization information processing section
103 color information processing section

BEST MODE FOR CARRYING OUT THE INVENTION

Hereinafter, preferred embodiments of an apparatus and method for image processing according to the present invention will be described with reference to the accompanying drawings.

Embodiment 1

Figure 1:
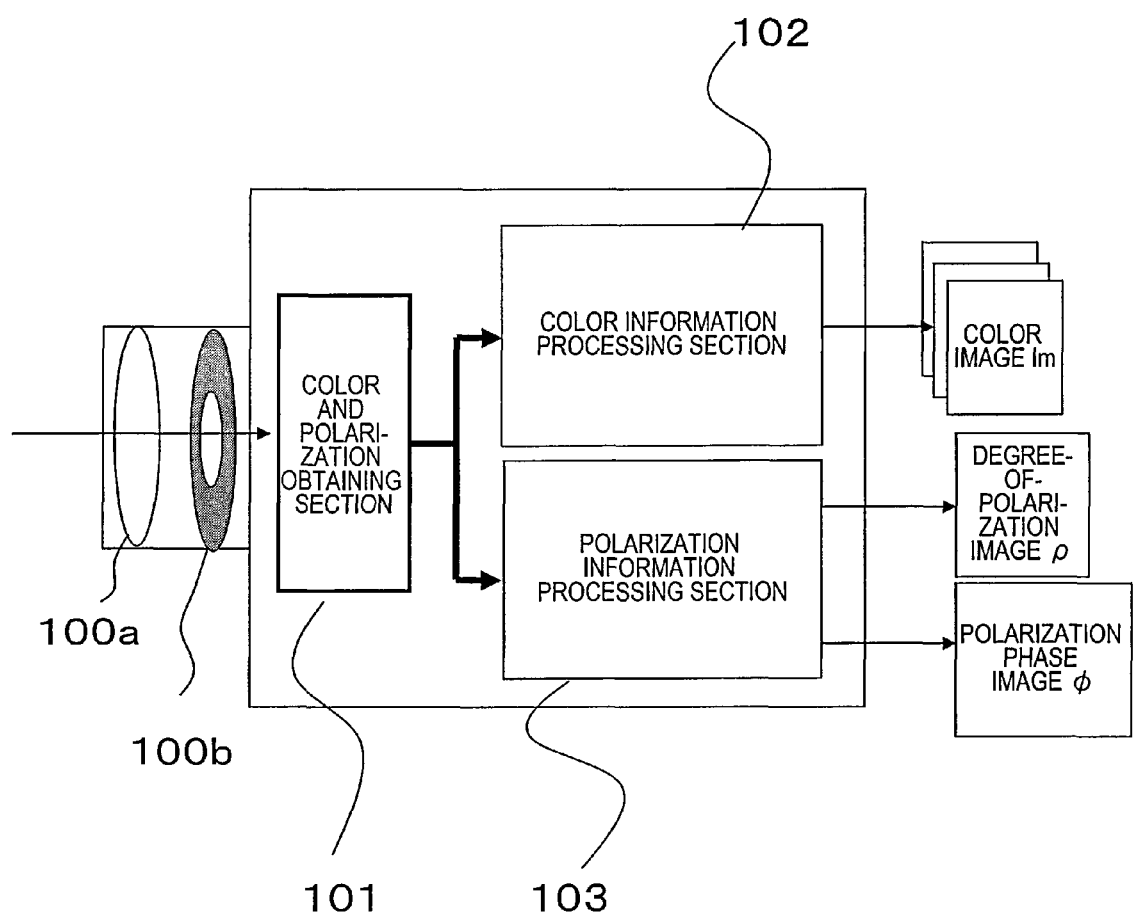
FIG. 1 is a block diagram illustrating a configuration for an image processing apparatus according to the present invention.

FIG. 1 is a block diagram illustrating a basic configuration that applies to every preferred embodiment of the present invention to be described herein. The apparatus of this preferred embodiment obtains not only color image information from an object in real time but also polarized image information at the same time, and outputs those pieces of information as two different types of polarized images (i.e., a degree-of-polarization image ρ and a polarization phase image Φ). After having passed through a lens 100*a* and a diaphragm 100*b*, the incident light enters a color and polarization obtaining section 101. From this incident light, the color and polarization obtaining section 101 can obtain both color moving picture information and polarized image information in real time. The color and polarization obtaining section 101 of this preferred embodiment can obtain information about colors (which will be referred to herein as "color information") and information about polarization (which will be referred to herein as "polarization information") at the same time. The color and polarization obtaining section 101 outputs a signal representing the color moving picture information and a signal representing the polarization information and image information to a color information processing section 102 and a polarization information processing section 103, respectively. In response, the color information processing section 102 and the polarization information processing section 103 subject these signals to various types of processing, thereby outputting color images $1m$, a degree-of-polarization image $\rho$ and a polarization phase image $\phi$.

Figure 2:
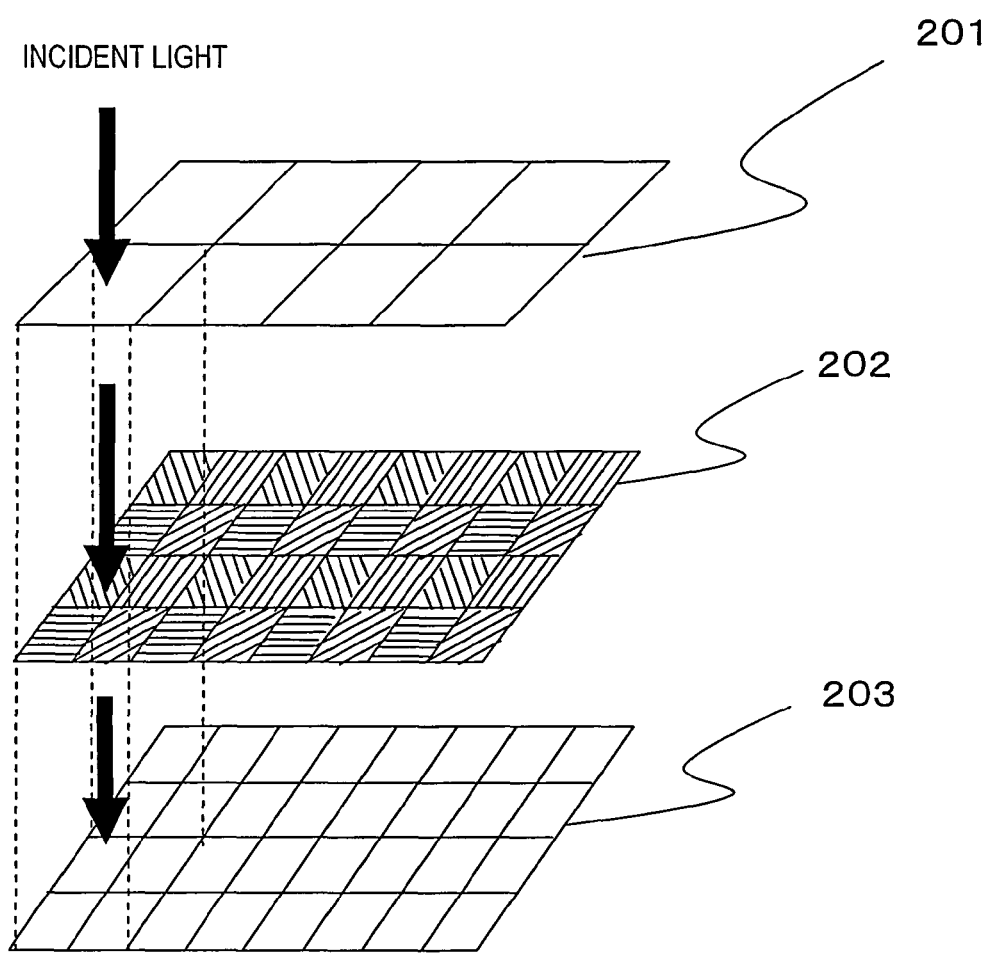
FIG. 2 illustrates an arrangement for a color and polarization obtaining section according to a first preferred embodiment of the present invention.

FIG. 2 is a schematic representation illustrating a basic arrangement for the color and polarization obtaining section 101. In the example illustrated in FIG. 2, a color filter 201 and a patterned polarizer 202 are stacked one upon the other in front of image capture element's pixels 203. However, the color filter and the patterned polarizer may be stacked in reverse order. The incident light is transmitted through the color filter 201 and the patterned polarizer 202 to reach the image capture element and have its intensity monitored by the image capture element's pixels 203. Thus, according to this preferred embodiment, color information and polarization information can be obtained at the same time using a color mosaic type, single-chip color image capture element.

Portion (a) of FIG. 3 illustrates a portion of the image sensing plane of the color and polarization obtaining section 101 as viewed from right over the plane in the optical axis direction. In portion (a) of FIG. 3, only 16 pixels (i.e., 4×4) on the image sensing plane are illustrated for the sake of simplicity. Each of the four square areas 301 through 304 illustrates an associated portion of a Bayer type color mosaic filter that is arranged on four pixel cells. Specifically, the square area 301 is a B-filter area and covers pixel cells B1 through B4, which B patterned polarizers with mutually different polarization main axes make close contact with. As used herein, the "polarization main axis" is an axis that is defined parallel to the polarization plane (i.e., polarization transmission plane) of the light to be transmitted through a polarizer. In this preferred embodiment, a number of polarizer units, of which the polarization transmission planes define mutually different angles (i.e., fine polarization plates), are arranged within each single color pixel. More specifically, four types of polarizer units, of which the polarization transmission planes are defined in mutually different directions, are arranged within each single color pixel that has a single color of R, G or B. In this case, one polarizer unit corresponds to one fine polarization pixel. In portion (a) of FIG. 3, the respective polarization pixels are identified by G1 and other reference signs.

Portion (b) of FIG. 3 shows the polarization main axes that are assigned to the four fine polarization pixels, which the B patterned polarizers make close contact with. In portion (b) of FIG. 3, the lines drawn in each of these fine polarization pixels schematically indicate the polarization main axis direction of that fine polarizer. Specifically, in the example illustrated in portion (b) of FIG. 3, the four fine polarization pixels have their polarization main axes defined by angles $\Psi i$ of 0, 45, 90 and 135 degrees, respectively.

Four G patterned polarizers make close contact with the pixels in the square area 302 and four more G patterned polarizers make close contact with the pixels in the square area 304. On the other hand, four R patterned polarizers make close contact with the pixels in the square area 303. In FIG. 3, the location identified by the reference numeral 305 indicates a virtual pixel location representing its associated four pixels collectively. The patterned polarizer in each of the other square areas 302 through 304 has also been divided into four portions with four different polarization main axes just as shown in portion (b) of FIG. 3.

Portion (a) of FIG. 4 illustrates another exemplary arrangement of pixels in the color and polarization obtaining section 101. In this example, G pixels are arranged in a cross pattern within a 3×3 block that is tilted by 45 degrees, and two sets of R fine polarization pixels and two sets of G fine polarization pixels are arranged alternately in the four pixels surrounding the G pixels. Portion (b) of FIG. 4 illustrates the detailed structure of each color pixel, which consists of four fine polarization pixels.

As described above, this preferred embodiment is characterized in that each color pixel includes a number of fine polarization pixels with mutually different polarization main axes. Thus, the color mosaic arrangement itself may be determined arbitrarily. In the following description, those fine polarization pixels will be simply referred to herein as "polarization pixels".

FIGS. 5(a) through 5(c) are graphs schematically showing the wavelength characteristics of the B, G, R polarization pixels, respectively. In these graphs, the ordinate represents the intensity of the transmitted light and the abscissa represents the wavelength. Each of these B, G and R polarization pixels has such a polarization property that transmits a transverse magnetic (TM) wave in the B, G or R wavelength range and reflects (i.e., not transmits) a transverse electric (TE) wave in that wavelength range. The TM wave is a wave in which magnetic field components are transverse to the incident plane, while the TE wave is a wave in which electric field components are transverse to the incident plane.

In FIG. 5(a), shown are the polarization properties 402 and 403 of the B polarization pixel and the transmission property 401 of a B color filter. The polarization properties 402 and 403 represent the transmittances of the TM and TE waves, respectively.

In FIG. 5(b), shown are the polarization properties 405 and 406 of the G polarization pixel and the transmission property 404 of a G color filter. The polarization properties 405 and 406 represent the transmittances of the TM and TE waves, respectively.

In FIG. 5(c), shown are the polarization properties 408 and 409 of the R polarization pixel and the transmission property 407 of an R color filter. The polarization properties 408 and 409 represent the transmittances of the TM and TE waves, respectively.

The properties shown in FIGS. 5(a) through 5(c) are realized by using the photonic crystal disclosed in Non-Patent Document No. 2, for example. When the photonic crystal is used, light, of which the electric field vector oscillating plane is parallel to the groove that has been cut on its surface, becomes a TE wave, and light, of which the electric field vector oscillating plane is perpendicular to the groove on its surface, becomes a TM wave.

What counts in this preferred embodiment is to use a patterned polarizer that exhibits polarization separation property in each of the B, G and R transmission wavelength ranges as shown in FIGS. 5(a) through 5(c).

FIG. 6 shows a situation where the transmission wavelength range of a G color filter and the polarization separation wavelength range determined by the polarization properties 4101 and 4102 disagree with each other. A polarizer that exhibits such characteristics cannot operate as intended by the present invention.

If the intensity of a monochrome image should be adjusted with polarization filters, there is no need to optimize the wavelength range in which the polarization separation is achieved. On the other hand, to obtain polarization information on a color pixel basis, the color separation property and the polarization separation property should be matched to each other.

In this description, the property of a polarization pixel will be represented by a combination (such as "R1" or "G1") of one of the four numerals "1", "2", "3" and "4" representing the polarization main axis direction of the polarization pixel and one of the three color codes "R", "G" and "B" representing the color of that polarization pixel. For example, the polarization pixels R1 and G1 have the same numeral, and therefore, their polarization main axis directions agree with each other. However, since their RGB codes are different from each other, these are polarization pixels, of which the wavelength ranges of the light to be transmitted are different from each other. In this preferred embodiment, the arrangement of such polarization pixels is realized by the combination of the color filter 201 and the patterned polarizer 202 shown in FIG. 2.

To obtain polarization components included in a particularly bright specular reflected portion of an object and polarization components included in a shadow area of the object just as intended, the dynamic range of the light intensity of the object and the number of bits thereof are preferably as large as possible (which may be 16 bits, for example).

The light intensity information that has been obtained on a polarization pixel basis by using the arrangement shown in FIG. 2 is processed by the polarization information processing section 103 shown in FIG. 1. Hereinafter, this processing will be described.

FIG. 7 shows the intensities 501 through 504 of light rays that have been transmitted through four types of polarizers, of which the polarization main axes (with $\Psi i=0, 45, 90$ and $135$ degrees, respectively) are defined in four different directions. In this example, if the angle of rotation $\phi$ of the polarization main axis is $\phi_i$, then the intensity measured will be identified by $I_i$, where i is an integer that falls within the range of 1 to N and N is the number of samples. In the example shown in FIG. 7, N=4, and therefore, i=1, 2, 3 or 4. In FIG. 7, the intensities 501 through 504 associated with the four pixel samples ($\phi_i$, Ii) are shown.

The relation between the angle $\Psi i$ of the polarization main axis and the intensities 501 through 504 is represented by a sinusoidal function. In FIG. 7, all of the four points representing the intensities 501 through 504 are illustrated as being located on a single sinusoidal curve. However, if a sinusoidal curve is plotted based on a greater number of intensities measured, some of those intensities measured may be slightly off the sinusoidal curve in some cases.

As used herein, the "polarization information" means information about the degree of modulation of the amplitude of such a sinusoidal curve, representing the degree of dependence of the intensity on the angle of the polarization main axis, and the phase information thereof.

In actual processing, using the four pixel intensity values in each of the areas 301 to 304 in the same color shown in portion (a) of FIG. 3 as samples, the reflected light intensity I with respect to the main axis angle $\phi$ of the patterned polarizer is approximated by the following Equation (1):

$$I(\Psi) = A \cdot \sin 2(\Psi - B) + C \qquad \text{Equation (1)}$$

In this case, A, B and C are constants as shown in FIG. 5 and respectively represent the amplitude, phase and average of the curve showing a variation in polarized light intensity. Equation (1) can be expanded as in the following Equation (2):

$$I(\Psi) = a \cdot \sin 2\Psi + b \cdot \cos 2\Psi + C \qquad \text{Equation (2)}$$

In this case, A and B are given by the following Equations (3) and (4), respectively:

$$A = \sqrt{a^2 + b^2}, \quad \sin(-2B) = \frac{b}{\sqrt{a^2 + b^2}}, \qquad \text{Equations (3)}$$

$$\cos(-2B) = \frac{a}{\sqrt{a^2 + b^2}}$$

$$B = -\frac{1}{2}\tan^{-1}\left(\frac{b}{a}\right) \qquad \text{Equation (4)}$$

The relation between the intensity I and the polarization main axis angle $\Psi$ can be approximated by the sinusoidal function represented by Equation (1) if A, B and C that will minimize the following Equation (5) can be obtained:

$$f(a, b, C) = \sum_{i=1}^{N}(I_i - a \cdot \sin 2\psi_i - b \cdot \cos 2\psi_i - C)^2 \qquad \text{Equation (5)}$$

By performing these processing steps, the three parameters A, B and C can be approximated by the sinusoidal function with respect to a single color.

In this manner, a degree-of-polarization image representing the degree of polarization $\rho$ and a polarization phase image representing the polarization phase $\phi$ can be obtained. Specifically, the degree of polarization $\rho$ represents how much the light in a pixel in question has been polarized, while the polarization phase $\phi$ represents the main axis angle of the partial polarization of the light in the pixel in question. It should be noted that the polarization main axis angles of 0 and 180 degrees ($\pi$) are the same as each other. The values $\rho$ and $\phi$ (where $0 \leq \phi \leq \pi$) are calculated by the following Equations (6) and (7), respectively:

$$\rho = \frac{I_{max} - I_{min}}{I_{max} + I_{min}} = \frac{A}{C} = \frac{A}{\bar{I}} \qquad \text{Equation (6)}$$

$$\phi = \frac{\pi}{4} + B \qquad \text{Equation (7)}$$

The image processing apparatus of this preferred embodiment is supposed to output the degree-of-polarization image $\rho$ and the polarization phase image $\phi$. However, any other pieces of polarization information may be output as long as those pieces of information are obtained from the sinusoidal function shown in FIG. 7. For example, the maximum and minimum intensity values Imax and Imin of the sinusoidal function and their associated angles $\Psi$max=$\phi$ and $\Psi$min may be output in combination as alternative pieces of polarization information.

FIG. 8 is an input image representing a plastic ball as a spherical object. Meanwhile, FIGS. 9(a) and 9(b) show an exemplary degree-of-polarization image $\rho$ (x, y) and an exemplary polarization phase image $\phi$ (x, y) with respect to the object shown in FIG. 8. The images shown in FIG. 9 are shown so as to increase its lightness as their degree of polarization $\rho$ or polarization phase $\phi$ rises.

FIGS. 10(a) and 10(b) are schematic representations to describe the images shown in FIG. 9. In the degree-of-polarization image $\rho$ (x, y), the more distant from the approximate center, where the camera's viewing direction agrees with the surface normal defined with respect to the ball, a pixel location becomes in the orientations 7101, the higher the degree of polarization ρ of that pixel. On the other hand, in the vicinity of the occluding edge of the ball (i.e., the boundary between the ball and the background) where the surface normal to the ball forms an angle of almost 90 degrees with respect to the camera's viewing direction, the degree of polarization ρ becomes maximum. In FIG. 10(a), these degrees of polarization ρ are schematically represented by contours.

Meanwhile, it can be seen that in the polarization phase image φ (x, y) shown in FIG. 10(b), the polarization phase increases monotonically counterclockwise in the directions indicated by the arrows 7102 and 7103 around the sphere in regular periods of 180 degrees with respect to the perpendicular line representing the vertical direction of the image that indicates that the phase is zero degrees. According to these polarization information images, it can be seen well that the degree of polarization ρ and the polarization phase φ correspond to the directions of the two degrees of freedom of the surface normal to the object. That is to say, the object's shape can be estimated based on the polarization information.

In this preferred embodiment, a degree-of-polarization image and a polarization phase image are supposed to be output based on the diffuse reflection components of the light reflected from the object. However, these images may also be output based on the specular reflection components thereof. In that case, the polarization phases φ are different by 90 degrees from the ones described above.

Also, the polarization information does not have to be the combination (ρ, φ) described above but may also be any other combination of pieces of information as long as those pieces of information are obtained based on the sinusoidal function shown in FIG. 5 or may even be images generated based on those pieces of information. For example, it is important to separate diffuse and specular reflection components of the object from the polarization information when applying this technique. To carry out this in the present invention, as for the polarized light in the specular reflection area, ρ (x, y) should be multiplied by a constant factor and then the product should be subtracted from the original image. Examples of such images generated in this manner are shown in FIGS. 11(a) through 11(d).

The color information processing section 102 shown in FIG. 1 calculates a color intensity based on the information that has been provided by the color and polarization obtaining section 101. The intensity of light that has been transmitted through a polarizer is different from the original intensity of the light yet to be incident on the polarizer. Theoretically speaking, under a non-polarized illumination, the average of the intensities measured along all polarization main axes of polarized light corresponds to the original intensity of the light yet to be incident on the polarizer. Supposing the measured intensity of a polarization pixel R1 is identified by $I_{R1}$, the color intensity can be calculated by the following Equation (8):

$$\bar{I}_R = (I_{R1} + I_{R2} + I_{R3} + I_{R4})/4$$

$$\bar{I}_G = (I_{G1} + I_{G2} + I_{G3} + I_{G4})/4$$

$$\bar{I}_B = (I_{B1} + I_{B2} + I_{B3} + I_{B4})/4 \qquad \text{Equations (8)}$$

By obtaining the intensities of respective polarization pixels, a normal color mosaic image can be generated. And by converting the mosaic image into a color image, of which the respective pixels have RGB pixel values, a color image Im can be generated. Such a conversion can be done by a known interpolation technique such as a Bayer mosaic interpolation technique.

The information about the intensities and polarization of the respective pixels in each of the color image Im, the degree-of-polarization image ρ and the polarization phase image φ is obtained by using the four polarization pixels shown in portion (b) of FIG. 3. That is why the respective pieces of information about the intensities and polarization can be regarded as showing a value at the virtual pixel point 305 that is located at the center of the four polarization pixels shown in portion (b) of FIG. 3. As a result, the resolutions of the color image and polarized image decrease to a half of the resolution of the image capture element both vertically and horizontally.

In this preferred embodiment, however, there are multiple fine polarizers within a color mosaic pixel in the single color as shown in FIGS. 3 and 4. That is why compared to a situation where non-quadruple color mosaic pixels are used in a fine image, a similar degree of resolution will be achieved.

Hereinafter, it will be described with reference to FIG. 12 how the color information processing section 102 and the polarization information processing section 103 shown in FIG. 1 operate.

First of all, the color and polarization obtaining section 101 obtains a color moving picture and a polarization information image in real time at the same time. In Steps to S803, measured values of polarized light intensities are obtained in each of the R, G and B pixels of the color moving picture. In this case, these processing steps S801, and S803 may be carried out in any arbitrary order and may even be carried out in parallel with each other. Specifically, four different polarized light intensities are obtained in the R, G and B color mosaic pixels. A signal representing these polarized light intensities is sent to the polarization information processing section 103 and then processed there in the following manner in the processing steps S804 through S808.

Specifically, in the processing steps S804, S805 and S806, sinusoidal function parameters are calculated based on the varying intensities obtained from the R, G and B pixels, respectively. The sinusoidal function parameters are defined as A, B and C in the Equation (1) mentioned above. These processing steps S804 through S806 are also independent of each other, and can be carried out in any arbitrary order or even in parallel with each other.

Thereafter, the color information processing section 102 shown in FIG. 1 performs the processing step S808. Specifically, the average intensity of the R, G and B pixels is calculated by the Equation (8) mentioned above, thereby generating a color intensity image I(x, y).

The image processing apparatus of the preferred embodiment described above can overcome the following two problems 1) and 2) with the prior art:

1) interference between color separation property and polarization property, and
2) difficulty to obtain color intensities and polarization information at the same time Specifically, as for the problem 1), according to this preferred embodiment, the interference can be eliminated by using polarizers, of which the polarization properties change within respective narrow wavelength ranges, independently of each other for the three colors of R, G and B. The other problem 2) can also be resolved by this preferred embodiment because polarization information can be obtained on a color-by-color basis by getting the polarization information separation system completely included in a single color separation system.

In the preferred embodiment described above, a photonic crystal is used for the patterned polarizer. Alternatively, the polarizer may also be a film type polarizer, a wire grid type polarizer or a polarizer operating on any other principle.

Embodiment 2

Hereinafter, a second preferred embodiment of an image processing apparatus according to the present invention will be described.

In the first preferred embodiment described above, a single plate color image capture system is used, and therefore, the resolution achieved is lower than the original resolution of the image capture element. Such a decrease in resolution is caused by the use of the color mosaic filter that separates the color according to the point of incidence of the incoming light. To overcome such a problem, according to this preferred embodiment, the color mosaic filter is replaced with a color separator that separates the light that has been incident on the same area into multiple different colors according to the wavelength range, thereby increasing the resolution compared to the first preferred embodiment described above.

The basic configuration of this preferred embodiment is also just as shown in the block diagram of FIG. 1. Thus, in the following description of the second preferred embodiment, FIG. 1 will be referred to again when necessary. The image processing apparatus of this preferred embodiment also obtains not only color image information from an object in real time but also polarized image information at the same time, and outputs those pieces of information as two different types of polarized images (i.e., a degree-of-polarization image and a polarization phase image). After having passed through a lens 100a and a diaphragm 100b, the incident light enters a color and polarization obtaining section 101. From this incident light, the color and polarization obtaining section 101 can obtain both color moving picture information and polarized image information in real time. As will be described later, the color and polarization obtaining section 101 of this preferred embodiment includes a color separation prism. The color and polarization obtaining section 101 outputs a signal representing the color moving picture information and a signal representing the polarization information and image information to a color information processing section 102 and a polarization information processing section 103, respectively. In response, the color information processing section 102 and the polarization information processing section 103 subject these signals to various types of processing, thereby outputting color images 1m, a degree-of-polarization image ρ and a polarization phase image φ.

First, the simplest exemplary configuration for the color and polarization obtaining section 101, including a color separation (dichroic) prism, will be described with reference to FIGS. 13A and 13B. The color and polarization obtaining section 101 shown in FIG. 13A includes image capture elements 1201, 1202 and 1203, to each of which an R patterned polarizer is added. The R, G and B rays that have been separated by the color separation prism are incident on the image capture elements 1201, 1202 and 1203, respectively.

FIG. 13B illustrates the arrangements of the three types of patterned polarizers that are added to the image capture elements 1201, 1202 and 1203, respectively. In this example, in each of the R, G, and B patterned polarizers, a combination pattern with polarization transmission planes that define the angles of 0, 45, 90 and 135 degrees is used repeatedly. Also, the wavelength characteristics of the polarizers satisfy the ones shown in FIG. 5.

In the exemplary arrangements shown in FIG. 13B, one set consists of four pixels. That is why polarization information can be obtained for each of the three primary colors of R, G and B as already described with reference to FIG. 3. Also, by averaging the intensities of the four pixels, a color image can also be obtained.

According to this exemplary configuration, however, the spatial resolution of the G pixel, which plays a key role in determining the viewer's visual impression, will decrease, which is still a problem. Thus, an alternative configuration for the color and polarization obtaining section 101 that has been modified to overcome this problem will be described with reference to FIG. 13C.

The color and polarization obtaining section 101 of this preferred embodiment includes a color separation prism 900, dedicated R, G and B image capture elements 901, 902 and 903, and R and B patterned polarizers 904 and 905. In the patterned polarizers 904 and 905, a pixel in which each fine polarizer unit is arranged will be referred to herein as a "polarization pixel".

By using the color separation prism 900, R, G and B image information can be obtained from each pixel of the object, and therefore, the resolution will increase. Also, in this preferred embodiment, a patterned polarizer is arranged in front of the R image capture element 901 and the B image capture element 903, but no polarizer is arranged in front of the G image capture element 902. That is why the resolution of the G image can be higher than that of the R or B image. The G ray is in a color to which the viewer has higher luminosity than the R ray or B ray. Consequently, by increasing the resolution of the G image, significant visual effects are achieved efficiently thanks to the increase in resolution.

FIGS. 14(a) through 14(c) illustrate R and B patterned polarizers 904 and 905 and associated G pixels. No patterned polarizer is provided for the G image capture element 902. The B patterned polarizer 905 and the R patterned polarizer 904 exhibit polarization properties in the B ray and R ray wavelength ranges as shown in FIGS. 5(a) and 5(c), respectively. The R patterned polarizer 904 has the following main polarization axes:

TABLE 1

| Polarization pixel | R1 | R2 | R3 | R4 |
|---|---|---|---|---|
| Polarization main axis | 0° | 45° | 90° | 135° |

On the other hand, the B patterned polarizer 905 has the following main polarization axes:

TABLE 2

| Polarization pixel | B6 | B7 | B8 | B9 |
|---|---|---|---|---|
| Polarization main axis | 22.5° | 67.5° | 112.5° | 157.5° |

The pixel that represents the polarization information obtained from the four polarization pixels will be referred to herein as a "center pixel 1001".

The arrangements of these patterned polarizers 904 and 905 are characterized in that:

(1) four polarization pixels with mutually different polarization main axes are arranged adjacent to each other within a block consisting of 2×2 pixels;

(2) the polarization main axes of each pair of adjacent polarization pixels within each of the blocks described above are different from each other by 45 degrees; and (3) the respective polarization main axes of the polarization pixels R1 through R4 and B5 through B9 are present at regular intervals of 22.5 degrees from 0 degrees through 180 degrees.

As long as these requirements are satisfied, the polarization pixels R1 through R4 and B5 through B9 may be arranged in any arbitrary order, e.g., in the order shown in FIG. 15(a) in which another exemplary arrangement of the polarization pixels R1 through R4 and B5 through B8 is shown. On the other hand, in the example illustrated in FIG. 15(b), polarization pixels R5 through R8 are arranged as R pixels and polarization pixels R1 through R4 are arranged as B pixels. In this case, the reference numerals 1 through 9 given to the polarization pixels define the respective angles of the polarization main axes as follows:

TABLE 3

| 1 | 2 | 3 | 4 | 5 | 6 | 7 | 8 |
|---|---|---|---|---|---|---|---|
| 0° | 22.5° | 45° | 67.5° | 90° | 112.5° | 135° | 157.5° |

Such a patterned polarizer may be made of photonic crystals disclosed in Non-Patent Document No. 2, for example.

In this preferred embodiment, polarization main axes with eight different orientations are dispersed in the R and B pixels. By performing integrating processing on the pieces of intensity information that have been obtained from these pixels, intensity information at the eight different angles of polarization in total can be obtained. Hereinafter, it will be described how to get such integrating processing done.

FIG. 16 is a graph showing the polarization main axis direction dependence of the intensity in a situation where the object is observed with the color and polarization obtaining section 101 with the configuration shown in FIG. 13C. There are various types of objects in the world of nature. However, supposing the object is made of a non-metallic dielectric, the property of reflected light produced by irradiating the object with illumination is described by the Fresnel reflection theory. For that reason, no matter whether the type of reflection is specular reflection or diffuse reflection, the property of its polarized light does not vary significantly in the wavelength ranges of R, G and B. That is to say, every sinusoidal function representing the variation in the intensity of R, G or B has a period of 180 degrees and changes in the same phase. Thus, using Equation (6) that represents the relation of the degree of polarization ρ, the three types of intensity variations are represented by the following Equation (9):

$$I_R(\Psi) = \bar{I}_R + A_R \sin(2\Psi - 2B) = \bar{I}_R[1 + \rho \sin(2\Psi - 2B)]$$

$$I_G(\Psi) = \bar{I}_G + A_G \sin(2\Psi - 2B) = \bar{I}_G[1 + \rho \sin(2\Psi - 2B)]$$

$$I_B(\Psi) = \bar{I}_B + A_B \sin(2\Psi - 2B) = \bar{I}_B[1 + \rho \sin(2\Psi - 2B)] \quad \text{Equations (9)}$$

Since the refractive index η and the angles of incidence and emittance of the light are substantially constant among R, G and B, the degree of polarization ρ is also constant among R, G and B. That is why the varying portions of the three types of sinusoidal functions represented by Equation (9) are the same among R, G and B.

The curves 1101, 1102 and 1103 shown in FIG. 16 represent the intensity variations of R, G and B, respectively. On the other hand, the lines 1104, 1105 and 1106 show the average intensities of R, G and B, respectively.

Since the apparatus of this preferred embodiment has the configuration shown in FIG. 13C, no patterned polarizer is provided for the G image capture element 902. That is why there are no measured values representing the variation in G intensity, and the curve 1102 is nothing but a one calculated by a theoretical formula. On the other hand, the average of the G intensities represented by the line 1105 is not a theoretical value but the average of the respective intensities of the four pixels $G_{00}$ through $G_{11}$ shown in FIG. 14. This average is measured as the intensity value at the point 1001. The point 1107 is put on the graph shown in FIG. 16 to indicate that the average of G intensities is an actually measured value.

The intensities $I_{R1}$ through $I_{R4}$ plotted as open circles indicate the intensities that were measured at four pixels of the R patterned polarizer 904 shown in FIG. 14. On the other hand, the intensities $I_{R5}$ through $I_{R8}$ plotted as solid circles indicate the intensities that were measured at four pixels of the B patterned polarizer 905. That is to say, those pieces of polarization information in the four directions are distributed in the two types of color components of R and B. The present inventors discovered via experiments that if a single intensity variation curve was determined based on only the intensity values that were measured at the polarization main axes in the four directions, the noise often increased too much to determine the intensity variation curve highly accurately. However, by using the intensity values that were measured at the polarization main axes in the eight directions as is done in this preferred embodiment, the noise can be reduced, and therefore, the intensity variation curve can be determined highly accurately. To determine a single intensity variation curve based on the intensity values that have been obtained for multiple different colors will be referred to herein as "integration". To get that integration done, the intensities $I_{R1}$ through $I_{R4}$ and $I_{B5}$ through $I_{B8}$ measured need to be corrected by subjecting those intensities to the conversion represented by the following Equation (10). And by integrating together the intensity values corrected, a sinusoidal curve is determined.

$$I'_{R1} = K_{rr} \cdot I_{R1}, \ I'_{R2} \quad \text{Equations (10)}$$
$$= K_{rr} \cdot I_{R2}, \ I'_{G3}$$
$$= K_{rr} \cdot I_{R3}, \ I'_{G4}$$
$$= K_{rr} \cdot I_{R4}$$

$$K_{rr} = \frac{\bar{I}_G}{\bar{I}_R} = \left( \frac{I_{G00} + I_{G01} + I_{G10} + I_{G11}}{I_{R1} + I_{R2} + I_{R3} + I_{R4}} \right)$$

$$I'_{B5} = K_{bb} \cdot I_{B5}, \ I'_{B6}$$
$$= K_{bb} \cdot I_{B6}, \ I'_{B7}$$
$$= K_{bb} \cdot I_{B7}, \ I'_{B8}$$
$$= K_{bb} \cdot I_{B8}$$

$$K_{bb} = \frac{\bar{I}_G}{\bar{I}_B} = \left( \frac{I_{G00} + I_{G01} + I_{G10} + I_{G11}}{I_{B1} + I_{B2} + I_{B3} + I_{B4}} \right)$$

FIG. 17 shows the results of that integration. The R and B intensities measured are corrected and integrated together so as to agree with the virtual G intensity variation curve that does not actually exist. The intensities $I'_{R1}$ through $I'_{R4}$ and $I'_{B5}$ through $I'_{B8}$ are located on a sinusoidal curve, of which the average intensity is represented by the line 1105. As for these eight corrected intensity values, a sinusoidal curve, of which the minimum squared error given by Equation (5) becomes the smallest, is calculated.

In this example, a virtual intensity variation curve is plotted with respect to G and the R and B intensities are integrated so as to be located on that G intensity variation curve. Alternatively, the integration may also be carried out such that the intensities in any other color are located on a non-G intensity variation curve.

For example, FIG. 18 shows another example in which the B intensities are adjusted to the R intensities. In that case, based on the B intensities $I_{B5}$ through $I_{B8}$, corrected B intensity values $I''_{B5}$ through $I''_{B8}$ are calculated by the following Equation (11):

$$I''_{B5} = L_{bb} \cdot I_{B5}, I''_{B6}$$
$$= L_{bb} \cdot I_{B6}, I''_{B7}$$
$$= L_{bb} \cdot I_{B7}, I''_{B8}$$
$$= L_{bb} \cdot I_{B8}$$

$$L_{bb} = \frac{\bar{I}_R}{\bar{I}_B} = \left(\frac{I_{R1} + I_{R2} + I_{R3} + I_{R4}}{I_{B1} + I_{B2} + I_{B3} + I_{B4}}\right)$$

Equations (11)

It is known that the R and B intensity values should be located on sinusoidal function curves having a period of 180 degrees theoretically speaking. That is why each of the R and B intensity values is given by averaging the intensity values measured at four points, at which the phases (i.e., the polarization main axis directions) shift from each other at regular intervals in the same color. That is to say, the R and B intensity values are represented by the following Equations (12):

$$\bar{I}_R = (I_{R1} + I_{R2} + I_{R3} + I_{R4})/4$$

$$\bar{I}_B = (I_{B1} + I_{B2} + I_{B3} + I_{B4})/4$$

Equations (12)

On the other hand, the G intensity value is equal to the intensity value measured because there is no polarizer in front of the G image capture element 902.

According to this preferred embodiment, an image with high resolution is obtained for G but an image, of which the resolution has decreased to just one fourth of that of G, is obtained for R and B. Nevertheless, since G that has most significant influence on the luminous efficacy of the human being has a high resolution, it is expected that the image quality will not deteriorate so sensibly to the human eyes as a whole.

In the preferred embodiment described above, the resolution can be increased by using a color separation prism. On top of that, unlike a color mosaic filter, no loss would be caused by absorption of light during the color separation process. Since the quantity of light that can be used effectively is roughly tripled compared to a color mosaic filter, the sensitivity can also be increased at the same time.

FIG. 19 shows how the operation of this preferred embodiment is done by the image processing apparatus shown in FIG. 1.

First, the color and polarization obtaining section 101 obtains a color moving picture and polarization information image simultaneously in real time. In Steps S1301 through S1303, the polarized light intensities that have been measured at respective R, G and B pixels of the color moving picture are obtained. These processing steps S1301 through S1303 may be carried in any arbitrary order and could be performed in parallel with each other as well. An actual intensity is obtained at a high resolution for G, but only the intensities of the light that has been transmitted through the polarizers are obtained at low resolutions for R and B.

However, as their resolutions are different from each other, pieces of polarization information about R and B are integrated together at the position 1001 shown in FIG. 14 to produce a polarization information image. Specifically, in Step S1304, the different polarized light intensities of the R image are integrated with those of G by Equation (10) using a correction coefficient Krr. In the same way, in the next processing step S1305, the different polarized light intensities of the B image are integrated with those of G using a correction coefficient Kbb. These processing steps S1304 through S1306 may also be performed in any arbitrary order and could be performed in parallel with each other.

In Step S1306, a degree-of-polarization image p (x, y) and a polarization phase image φ (x, y) are generated at the position 101 shown in FIG. 14.

The color information processing section 102 shown in FIG. 1 generates low-resolution images, associated with the position 1001 of R and B, by Equation (11) in Step S1307, thereby generating a color intensity image Im (x, y) by combining them with the high-resolution image and pixel location of G in Step S1308.

The image processing apparatus of the preferred embodiment described above can overcome the following two problems 1) and 2) with the prior art:

1) interference between color separation property and polarization property, and
2) difficulty to obtain color intensities and polarization information at the same time Specifically, as for the problem 1), according to this preferred embodiment, the interference can be eliminated by using polarizers, of which the polarization properties change within respective narrow wavelength ranges, independently of each other for the three colors of R, G and B. The other problem 2) can also be resolved by this preferred embodiment because the R, G and B separation is carried out by the color separation prism such that G is represented by normal color intensity pixels and that R and B are represented by polarization pixels. The polarization angle information that lacks is obtained by means of integration, i.e., by multiplying the R and B intensity values measured by a constant correction coefficient. In this manner, the color intensities and polarization information can be obtained at the same time so as to get substantially six different pieces of polarization angle information.

In the preferred embodiment described above, a photonic crystal is used for the patterned polarizer. Alternatively, the polarizer may also be a film type polarizer, a wire grid type polarizer or a polarizer operating on any other principle.

Embodiment 3

Hereinafter, a third preferred embodiment of an image processing apparatus according to the present invention will be described.

In the second preferred embodiment described above, patterned polarizers are used, and therefore, the R and B resolutions, in particular, become lower than the original resolutions of the image capture elements. According to this preferred embodiment, such a decrease in R and B resolution can be avoided.

The basic configuration of this preferred embodiment is also just as shown in the block diagram of FIG. 1. Thus, in the following description of the third preferred embodiment, FIG. 1 will be referred to again when necessary. The image processing apparatus of this preferred embodiment also obtains not only color image information from an object in real time but also polarized image information at the same time, and outputs those pieces of information as two different types of polarized images (i.e., a degree-of-polarization image and a polarization phase image). After having passed through a lens 100a and a diaphragm 100b, the incident light enters a color and polarization obtaining section 101. From this incident light, the color and polarization obtaining section 101 can obtain both color moving picture information and polarized image information in real time. As will be described later, the color and polarization obtaining section 101 of this preferred embodiment includes a color separation prism. The color and polarization obtaining section 101 outputs a signal representing the color moving picture information and a signal representing the polarization information and image information to a color information processing section 102 and a polarization information processing section 103, respectively. In response, the color information processing section 102 and the polarization information processing section 103 subject these signals to various types of processing, thereby outputting color images Im, a degree-of-polarization image ρ and a polarization phase image φ.

Hereinafter, a configuration for the color and polarization obtaining section 101 according to this preferred embodiment will be described with reference to FIG. 20.

FIG. 20 illustrates a configuration for the color and polarization obtaining section 101 of this preferred embodiment. This color and polarization obtaining section 101 includes a color separation prism 900 and R, G and B polarization beam splitters 1407, 1408 and 1409. The R ray that has been separated by the R polarization beam splitter 1408 is incident on an image capture element 1401 that extracts P polarized light components and on an image capture element 1402 that extracts S polarized light components. In the same way, the G ray that has been separated by the G polarization beam splitter 1407 is incident on an image capture element 1403 that extracts P polarized light components and on an image capture element 1404 that extracts S polarized light components. And the B ray that has been separated by the B polarization beam splitter 1409 is incident on an image capture element 1406 that extracts P polarized light components and on an image capture element 1405 that extracts S polarized light components.

According to this preferred embodiment, the polarization information is obtained by using a polarization beam splitter instead of the patterned polarizer, and therefore, the resolution does not decrease and polarization information can also be obtained from G components associated with high luminous efficacy.

As used herein, the polarization beam splitter is a filter that splits the incoming light according to its polarization components, and its filter plane, which is tilted at an angle of 45 degrees with respect to the optical axis of the incoming light ray, transmits P polarized light components and reflects S polarized light components. The operating wavelength range of the polarization beam splitter does not cover the entire visible radiation range but is relatively narrow as in the patterned polarizer. In this preferred embodiment, the R, G and B beam splitters 1407, 1408 and 1408 are all designed such that their operating wavelength ranges correspond with the R, G and B wavelength ranges in which the color separation prism separates the incoming light into the three colors as shown in FIG. 5.

The polarization beam splitter normally obtains polarization information from only the P and S components that are defined in two orthogonal directions. According to this preferred embodiment, however, polarization information can be obtained at multiple angles of polarization by rotating the R and B polarization beam splitters 1407 and 1409 around their optical axes to a predetermined degree and fixing them there. In FIG. 20, the R and B image capture elements 1407 and 1409 are illustrated without showing their angles of rotation so clearly. But FIG. 21 illustrates the angles of rotation more clearly. That is to say, FIG. 20 illustrates an arrangement in which the R, G and B beam splitters 1407 to 1409 have been rotated around their axes of rotation and fixed there with their associated image capture elements arranged accordingly.

As shown in FIG. 21, the R polarization beam splitter 1407 has rotated +30 degrees, and the B polarization beam splitter 1409 has rotated −30 degrees, with respect to the G polarization beam splitter 1408. That is why the G polarized light can be measured at polarization main axes that have rotated 0 and 90 degrees, the R polarized light can be measured at polarization main axes that have rotated 30 and 120 degrees, and the B polarized light can be measured at polarization main axes that have rotated 60 and 150 degrees, respectively. That is to say, the image capture element 1401 obtains Rp (i.e., P polarized light components of the R ray) and the image capture element 1402 obtains Rs (i.e., S polarized light components of the R ray). In the same way, the image capture element 1403 obtains Gp (i.e., P polarized light components of the G ray) and the image capture element 1404 obtains Gs (i.e., S polarized light components of the G ray). Likewise, the image capture element 1405 obtains Bs (i.e., S polarized light components of the G ray) and the image capture element 1406 obtains Bp (i.e., P polarized light components of the B ray).

FIG. 22 shows, with the same angular coordinates, the polarization main axis angles that are measured by the beam splitters shown in FIG. 20 and 21. The reference numerals shown in FIG. 22 denote their associated image capture elements shown in FIGS. 20 and 21. The polarization main axes of the polarized light, at which the intensities are measured, rotate from 0 degrees through 180 degrees in the order of Gp, Rp, Bs, Gs Rs and Bp.

FIG. 23 shows the R, G and B intensity variation curves 1701, 1702 and 1703 and the average intensities of R, G and B 1704, 1705 and 1706. The intensities $I_{GP}$ and $I_{RS}$ measured by the image capture elements 1403 and 1404 are indicated by the shadowed circles. The intensities $I_{RP}$ and $I_{RS}$ measured by the image capture elements 1401 and 1402 are indicated by the open circles. And the intensities $I_{BS}$ and $I_{BP}$ measured by the image capture elements 1405 and 1406 are indicated by the solid circles. That is to say, pieces of polarization information about the orthogonal polarization main axes of the P and S polarized light rays are distributed in the three types of color components of R, G and B. Theoretically speaking, it is impossible to determine one sinusoidal function curve based on two intensity values. That is why the sinusoidal function curves cannot be plotted on a color-by-color basis. Thus, according to this preferred embodiment, the sinusoidal function curve is determined by integrating the intensity values that have been measured for the respective colors. To get this integration done, as already described for the second preferred embodiment, the six intensities $I_{RP}$ to $I_{BS}$ obtained are subjected to the transform represented by the following Equations (13):

$$I'_{RP} = Kr \cdot I_{RP}, \quad I'_{RS} = Kr \cdot I_{RS}$$

$$I'_{GP} = I_{GP}, \quad I'_{GS} = I_{GS}$$

$$I'_{BP} = Kb \cdot I_{BP}, \quad I'_{BS} = Kb \cdot I_{BS}$$

$$Kr = \frac{\bar{I}_G}{\bar{I}_R} = \left(\frac{I_{GP} + I_{GS}}{I_{RP} + I_{RS}}\right)$$

$$Kb = \frac{\bar{I}_G}{\bar{I}_B} = \left(\frac{I_{GP} + I_{GS}}{I_{BP} + I_{BS}}\right)$$

Equations (13)

That is to say, using the correction coefficients Kr and Kb, correction is made to adjust the R and B intensities to the G intensity. After the correction is done in this manner, the sinusoidal function curve is determined using samples of the integrated intensities.

FIG. 24 shows the sinusoidal function curve obtained by that integration. The R and B measured values have been integrated and now located on the G intensity variation curve. If the sinusoidal function curve is determined by optimizing the intensities at these six points that have been set in this manner by the minimum squared error method represented by Equation (5), the polarization information can be obtained with high accuracy.

As the sinusoidal function curve representing the color intensities has a period of 180 degrees, an intensity value for a color can be obtained by calculating the average of the intensities measured at two points for the same color but with phases that are different from each other by 90 degrees.

$$\bar{I}_R = (I_{RP} + I_{RS})/2$$

$$\bar{I}_G = (I_{GP} + I_{GS})/2$$

$$\bar{I}_B = (I_{BP} + I_{BS})/2 \qquad \text{Equations (14)}$$

As described above, since polarization beam splitters are used in this preferred embodiment, not just the decrease in R and B resolution but also the loss in the quantity of light due to absorption of the light into polarization filters are avoidable, thus achieving a significant increase in sensitivity.

FIG. 25 shows how the operation of this preferred embodiment gets done by the image processing apparatus shown in FIG. 1. And the color and polarization obtaining section is supposed to operate just as described for the third preferred embodiment. First of all, the color and polarization obtaining section 101 obtains a color moving picture and a polarization information image simultaneously in real time, and its signal is sent to the polarization information processing section 103 and processed in the following manner. First, in Steps S1901 to S1903, the color and polarization obtaining section 101 obtains the measured values of multiple different polarized light intensities for each of the R, G and B images that have been shot. That is to say, since two different types of polarized light intensities (of P and S polarized light rays) are obtained for each of the R, G and B images, two pictures are gotten as each of the R, G and B images. It should be noted that these processing steps S1901 to S1903 could be performed in any arbitrary order or even in parallel with each other.

Next, in Step S1904, the different polarized light intensities of the R image are integrated with those of G using the correction coefficient Kr. In the same way, in Step S1904, the different polarized light intensities of the B image are integrated with those of G using the correction coefficient Kb. This processing is performed by Equation (13). As a result, those pictures are integrated together into six images in total for R, G and B. These processing steps S1904 and S1905 may also be performed in any arbitrary order and could be performed in parallel with each other. Subsequently, in Step S1906, using these images, the sinusoidal function (i.e., the parameters A, B and C) is determined on a pixel-by-pixel basis by Equation (5). Finally, in Step S1907, a degree-of-polarization image ρ (x, y) is generated by Equation (6).

The color information processing section 102 obtains two R, G or B images for P and S polarized light rays and calculates the average intensities of R, G and B by Equation (14), thereby generating a color intensity image I (x, y).

INDUSTRIAL APPLICABILITY

The image processing apparatus of the present invention can obtain polarization information from an object without using any special projector, and therefore, can be used in various types of digital still cameras, digital movie cameras, monitor cameras and so on. In addition, to compensate for the potential lack of image intensity information that would be caused as the sizes of cameras are further reduced from now on, the apparatus of the present invention can perform the image processing using the surface shape information to be calculated based on the polarization information.

The invention claimed is:

1. An image processing apparatus comprising:
   a color and polarization obtaining section including a single-chip color image capture element with a color mosaic filter and a patterned polarizer in which a number of polarizer units, of which the polarization transmission planes define mutually different angles, are arranged adjacent to each other within each single color pixel of the color mosaic filter;
   a polarization information processing section for approximating, as a sinusoidal function, a relation between the intensities of light rays that have been transmitted through the polarizer units within each said single color pixel and the angles of the polarization transmission planes of the polarizer units; and
   a color information processing section for getting average color intensity information by averaging the intensities of the light rays that have been transmitted through the polarizer units within each said single color pixel.

2. The image processing apparatus of claim 1, wherein the wavelength dependences of polarization in the polarizer units that are used for each single color pixel are substantially equal to each other within a wavelength range associated with that color.

3. The image processing apparatus of claim 1, wherein the patterned polarizer includes (180/ θ) different types of polarizer units, of which the polarization transmission planes define various angles that are different from each other by θ degrees, for each said pixel.

4. An image processing apparatus comprising:
   a color and polarization obtaining section including a color separation element for separating incident light into light rays in multiple different colors and a plurality of image capture elements that receive the light rays in multiple different colors produced by the color separation element;
   polarization information processing section for obtaining polarization information based on the outputs of the image capture elements; and
   color information processing section for getting average color intensity information based on the outputs of the image capture elements,
   wherein the image capture elements include at least one high-resolution image capture element for obtaining a high-resolution single-color image based on a light ray in a first color that is included in the multiple different colors separated, and at least one low-resolution image capture element for obtaining a low-resolution image based on a light ray in a second color that is also included in the multiple different colors separated, and
   wherein the low-resolution image capture element includes a patterned polarizer in which a number of polarizer units, of which the polarization transmission planes are defined in mutually different directions, are arranged adjacent to each other, and wherein the polarization information processing section obtains the polarization information by integrating together the intensities of the light rays that have been transmitted through the polarizer units.

5. The image processing apparatus of claim 4, wherein the color separation element separates the incident light into R, G and B rays, and wherein the high-resolution single-color element receives the G ray.

6. The image processing apparatus of claim 4, wherein the at least one low-resolution image capture element includes a plurality of low-resolution image capture elements, and wherein a plurality of patterned polarizers, associated with those low-resolution image capture elements, includes a total of $(180/\theta)$ different types of polarizer units, of which the polarization transmission planes define various angles that are different from each other by $\theta$ degrees.

7. The image processing apparatus of claim 4, wherein the polarization information processing section multiplies the measured intensities of different polarized light rays that have been produced with respect to multiple different colors by a correction coefficient, thereby obtaining a corrected intensity value with respect to one color.

8. An image processing apparatus comprising:

a color and polarization obtaining section including a color separation element for separating incident light into light rays in multiple different colors, a plurality of polarization beam splitters that receive the light rays in multiple different colors that have been produced by the color separation element, and a plurality of image capture elements that includes a pair of image capture elements for receiving light rays that have been reflected from, or transmitted through, the respective polarization beam splitters;

a polarization information processing section for obtaining polarization information based on the outputs of the image capture elements; and a color information processing section for getting average color intensity information based on the outputs of the image capture elements, wherein the polarization information processing section obtains the polarization information by integrating together the intensities of the light rays that have been incident on the image capture elements.

9. The image processing apparatus of claim 8, wherein the polarization transmission planes of the polarization beam splitters define mutually different angles.

10. The image processing apparatus of claim 9, wherein the angles defined by the polarization transmission planes of the polarization beam splitters are different from each other by ±30 degrees.

11. An image input method comprising the steps of:

obtaining measured values of color polarization information for R, G and B images;

integrating together the intensities of the color images in mutually different polarization states into an intensity for a single color using a correction coefficient;

approximating a variation in intensity, which has been integrated on a pixel-by-pixel basis, as a sinusoidal function;

generating a degree-of-polarization image based on the maximum and minimum values of the sinusoidal function; and calculating the average intensity of the R, G and B images, thereby generating a color intensity image.

* * * * *